(12) United States Patent
Motosugi et al.

(10) Patent No.: US 8,997,010 B2
(45) Date of Patent: Mar. 31, 2015

(54) USER INTERFACE DEVICE

(75) Inventors: Toshihisa Motosugi, Okazaki (JP); Jiro Goto, Toyokawa (JP); Shin Ohba, Toyokawa (JP); Masayuki Ito, Nagoya (JP); Kana Yamauchi, Toyohashi (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 1025 days.

(21) Appl. No.: 12/729,794

(22) Filed: Mar. 23, 2010

(65) Prior Publication Data

US 2010/0241982 A1    Sep. 23, 2010

(30) Foreign Application Priority Data

Mar. 23, 2009 (JP) ................. 2009-069943

(51) Int. Cl.
 *G06F 3/048* (2013.01)
 *G06F 3/12* (2006.01)
 (Continued)

(52) U.S. Cl.
 CPC .......... *G06F 3/1204* (2013.01); *G06F 3/04842* (2013.01); *G06F 3/0484* (2013.01); *G06F 3/1258* (2013.01); *H04N 1/00413* (2013.01); *H04N 1/00432* (2013.01); *H04N 1/00466* (2013.01); *H04N 1/00482* (2013.01); *H04N 1/00509* (2013.01); *H04N 2201/0094* (2013.01)
 USPC .......................................... 715/771; 715/704

(58) Field of Classification Search
 CPC ........................... G06F 3/0484; G06F 3/04842
 USPC .................................. 715/704, 771
 See application file for complete search history.

(56) References Cited

U.S. PATENT DOCUMENTS

2005/0052684 A1* 3/2005 Ferlitsch ...................... 358/1.15
2005/0111866 A1* 5/2005 Sato ............................ 399/79
(Continued)

FOREIGN PATENT DOCUMENTS

JP   3-191413   8/1991
JP   10-27089   1/1998
(Continued)

OTHER PUBLICATIONS

Japanese Notification of Reasons for Refusal mailed Feb. 8, 2011, directed to counterpart Japanese Application No. 2009-069943; 7 pages.

*Primary Examiner* — Tuyetlien Tran
(74) *Attorney, Agent, or Firm* — Buchanan Ingersoll & Rooney PC

(57) ABSTRACT

A user interface device which displays an operation key in a display unit using a predetermined design. The device includes: a history storing unit that stores a history record in which a content of a setting operation carried out by a user for each of past jobs that have been executed is recorded; a history retrieving unit that retrieves the history record in which the content of the setting that is the same as a current content of the setting is recorded; a calculating unit that calculates a total number of operations for each operation key based on the content of the setting recorded in the history record in which the same content of setting is recorded; and an operation key display type determining unit that estimates relative degrees of likelihood to be used by the user of the operation keys based on the total number of operations for each operation key, and determines, based on the estimation, a design to be used to display the operation key out of a group of designs including at least a first design for normal display and a second design for highlighted display.

12 Claims, 24 Drawing Sheets

(51) Int. Cl.
*H04N 1/00* (2006.01)
*G06F 3/0484* (2013.01)

(56) References Cited

U.S. PATENT DOCUMENTS

| | | | |
|---|---|---|---|
| 2005/0246325 A1* | 11/2005 | Pettinati et al. | 707/3 |
| 2006/0090142 A1* | 4/2006 | Glasgow et al. | 715/780 |
| 2006/0245006 A1* | 11/2006 | Nakata et al. | 358/448 |
| 2007/0019229 A1* | 1/2007 | Matsuhara | 358/1.15 |
| 2007/0067269 A1* | 3/2007 | Rudge et al. | 707/3 |
| 2007/0077643 A1 | 4/2007 | Nakamura et al. | |
| 2007/0109580 A1* | 5/2007 | Yoshida | 358/1.13 |
| 2007/0201091 A1* | 8/2007 | Tanaka | 358/1.16 |
| 2007/0253015 A1* | 11/2007 | Eguchi et al. | 358/1.14 |
| 2007/0294624 A1* | 12/2007 | Singh et al. | 715/747 |
| 2008/0022212 A1* | 1/2008 | Kodimer et al. | 715/744 |
| 2008/0084580 A1* | 4/2008 | Tamura et al. | 358/1.15 |
| 2008/0192283 A1* | 8/2008 | Kobayashi | 358/1.15 |
| 2008/0229407 A1* | 9/2008 | Nakatomi | 726/17 |
| 2008/0239374 A1* | 10/2008 | Yamaguchi et al. | 358/1.15 |
| 2008/0304849 A1* | 12/2008 | Harigae | 399/83 |
| 2009/0180144 A1* | 7/2009 | Ito | 358/1.16 |

FOREIGN PATENT DOCUMENTS

| | | |
|---|---|---|
| JP | 10-289060 | 10/1998 |
| JP | 2006-164058 | 6/2006 |
| JP | 2006-343842 | 12/2006 |
| JP | 2007-101351 | 4/2007 |
| JP | 2008-117061 | 5/2008 |
| JP | 2008-236016 | 10/2008 |

* cited by examiner

Fig. 6

| TOTAL NUMBER OF "SINGLE SIDE⇒DOUBLE SIDES" COPY JOB EXECUTIONS | 100 |
|---|---|

| MODE | TAB TYPE | TOTAL NUMBER OF OPERATIONS | RANK | HIERARCHICAL LEVEL CONSIDERATION (x) | LIKELIHOOD VALUE | RANK | POSITION CONSIDERATION (x) | LIKELIHOOD VALUE | RANK | HIERARCHICAL LEVEL & TAB POSITION CONSIDERATION | LIKELIHOOD VALUE | RANK |
|---|---|---|---|---|---|---|---|---|---|---|---|---|
| COLOR MODE | TOP | 60 | NOT RANKED | — | NOT RANKED | NOT RANKED | — | NOT RANKED | NOT RANKED | NOT RANKED | NOT RANKED | NOT RANKED |
| PAPER SIZE | TOP | 70 | NOT RANKED | — | NOT RANKED | NOT RANKED | — | NOT RANKED | NOT RANKED | NOT RANKED | NOT RANKED | NOT RANKED |
| TYPE OF PAPER | TOP | 20 | NOT RANKED | — | NOT RANKED | NOT RANKED | — | NOT RANKED | NOT RANKED | NOT RANKED | NOT RANKED | NOT RANKED |
| MAGNIFICATION RATIO | TOP | 40 | NOT RANKED | — | NOT RANKED | NOT RANKED | — | NOT RANKED | NOT RANKED | NOT RANKED | NOT RANKED | NOT RANKED |
| ORIGINAL=COPY/SINGLE SIDE=DOUBLE SIDES | TOP | — | — | — | — | — | — | — | — | — | — | — |
| N in 1 | TOP | 10 | NOT RANKED | 1 | NOT RANKED | NOT RANKED | 1 | NOT RANKED | NOT RANKED | NOT RANKED | NOT RANKED | NOT RANKED |
| SORT/GROUP | FINISHING | 6 | 4 | 1 | 6 | 5 | 1.1 | 6.5 | 1 | 1 | 6 | 7 |
| STAPLE | FINISHING | 20 | 1 | 1 | 20 | 1 | 1.1 | 20.1 | 1 | 1 | 20.1 | 1 |
| PUNCH | FINISHING | 2 | 8 | 1 | 2 | 12 | 1.1 | 2 | 14 | 1 | 2 | 16 |
| BINDING MARGIN OF ORIGINAL | ORIGINAL DESIGNATION | 11 | 2 | 1.1 | 11.2 | 2 | 1.1 | 12.1 | 3 | 1.1 | 12.1 | 3 |
| ORIGINAL ORIENTATION | ORIGINAL DESIGNATION | 2 | 8 | 1 | 2 | 12 | 1.1 | 2.2 | 13 | 1.1 | 2.2 | 15 |
| ORIGINAL IMAGE TYPE | IMAGE TYPE | 2 | 8 | 1 | 2 | 12 | 1.2 | 2.4 | 10 | 1.2 | 2.4 | 14 |
| DENSITY | IMAGE TYPE | 4 | 6 | 1 | 4 | 8 | 1.2 | 4.8 | 7 | 1.2 | 4.8 | 11 |
| OUTPUT IMAGE QUALITY | | | | | | | | | | | | |
| BRIGHTNESS | IMAGE TYPE | 2 | 8 | 1.5 | 3 | 9 | 1.2 | 2.4 | 10 | 1.8 | 5.4 | 9 |
| CONTRAST | IMAGE TYPE | 1 | 14 | 1.5 | 1.5 | 15 | 1.2 | 1.2 | 16 | 1.8 | 2.7 | 13 |
| SATURATION | IMAGE TYPE | 2 | 8 | 1.5 | 3 | 9 | 1.2 | 2.4 | 10 | 1.8 | 5.4 | 9 |
| LEAFLET | ADVANCED | 5 | 5 | 1 | 5 | 6 | 1.3 | 6.5 | 4 | 1.3 | 6.5 | 6 |
| BINDING MARGIN OF SHEET | ADVANCED | 10 | 3 | 1 | 10 | 3 | 1.3 | 13 | 2 | 1.3 | 13 | 2 |
| IMAGE REPEAT | ADVANCED | 0 | | 1 | 0 | | 1.3 | 0 | | 1.3 | 0 | |
| PAGE EDIT | | | | | | | | | | | | |
| OHP SLIP SHEET | ADVANCED | 1 | 14 | 1.5 | 1.5 | 15 | 1.3 | 1.3 | 15 | 1.95 | 2.925 | 12 |
| COVER SHEET | ADVANCED | 2 | 8 | 1.5 | 3 | 9 | 1.3 | 2.6 | 9 | 1.95 | 5.85 | 8 |
| INTERSHEET | ADVANCED | 0 | | 1.5 | 0 | | 1.3 | 0 | | 1.95 | 0 | |
| STAMP/PAGE PRINT | | | | | | | | | | | | |
| DATE/TIME | ADVANCED | 4 | 6 | 1.5 | 6 | 4 | 1.3 | 5.2 | 6 | 1.95 | 11.7 | 4 |
| PAGE PRINT | ADVANCED | 3 | 7 | 1.5 | 4.5 | 7 | 1.3 | 3.9 | 8 | 1.95 | 8.775 | 5 |
| STAMP | ADVANCED | 0 | | 1.5 | 0 | | 1.3 | 0 | | 1.95 | 0 | |

{141 = TOTAL NUMBER OF OPERATIONS / RANK}
{143 = HIERARCHICAL LEVEL CONSIDERATION (x) / LIKELIHOOD VALUE / RANK}
{145 = POSITION CONSIDERATION (x) / LIKELIHOOD VALUE / RANK}
{147 = HIERARCHICAL LEVEL & TAB POSITION CONSIDERATION / LIKELIHOOD VALUE / RANK}

Fig.7A1
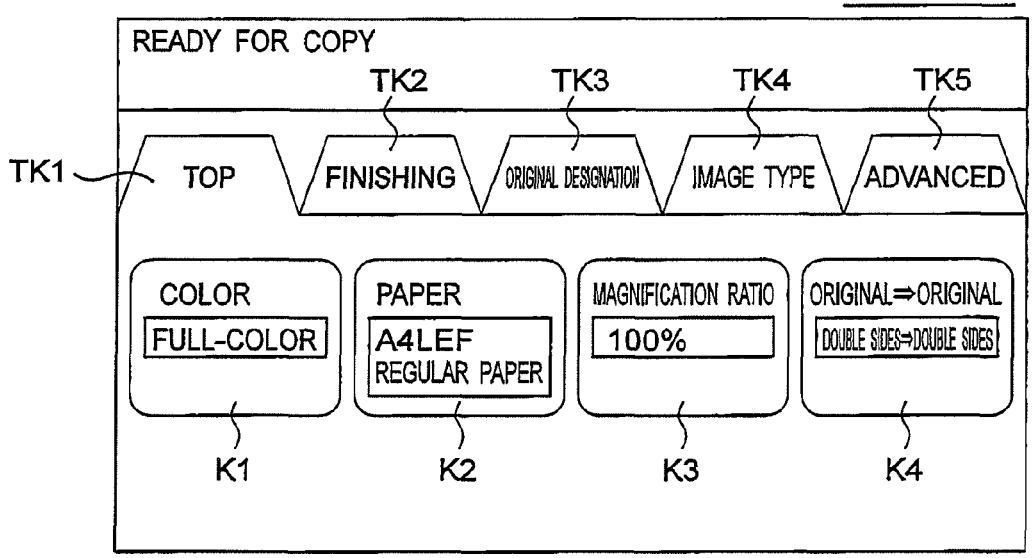
Fig.7A2
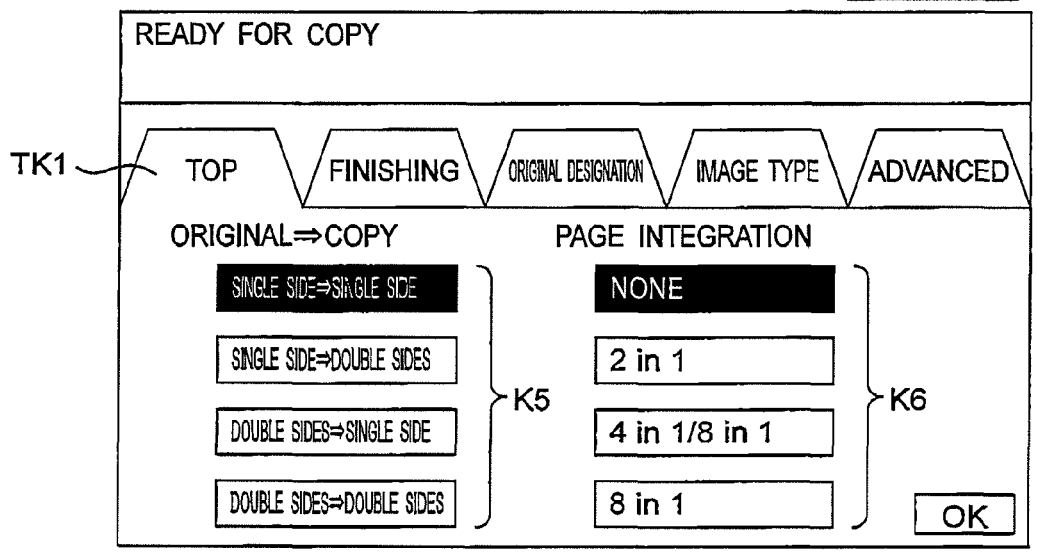

*Fig.7D1*
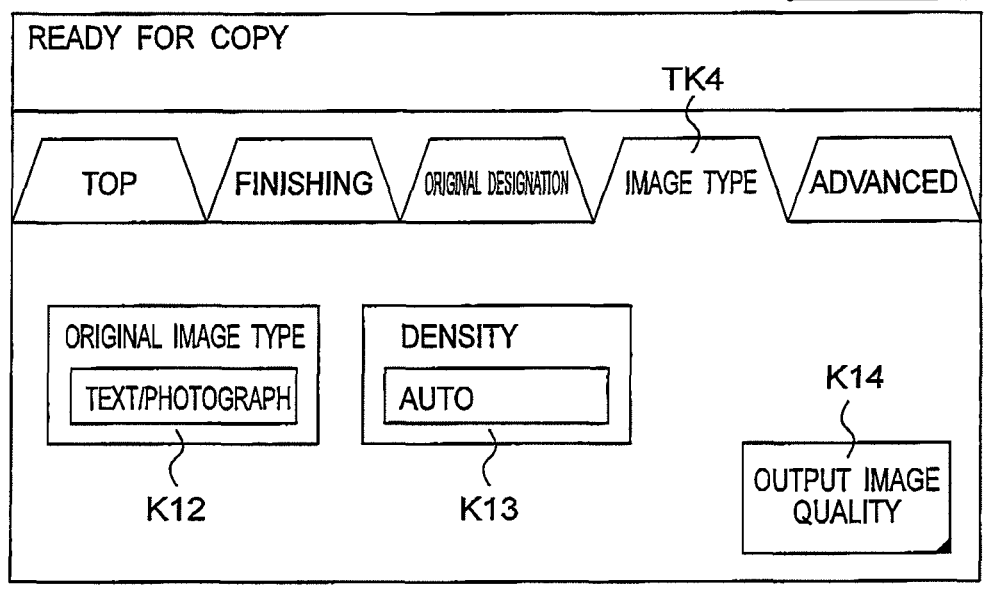
*Fig.7D2*
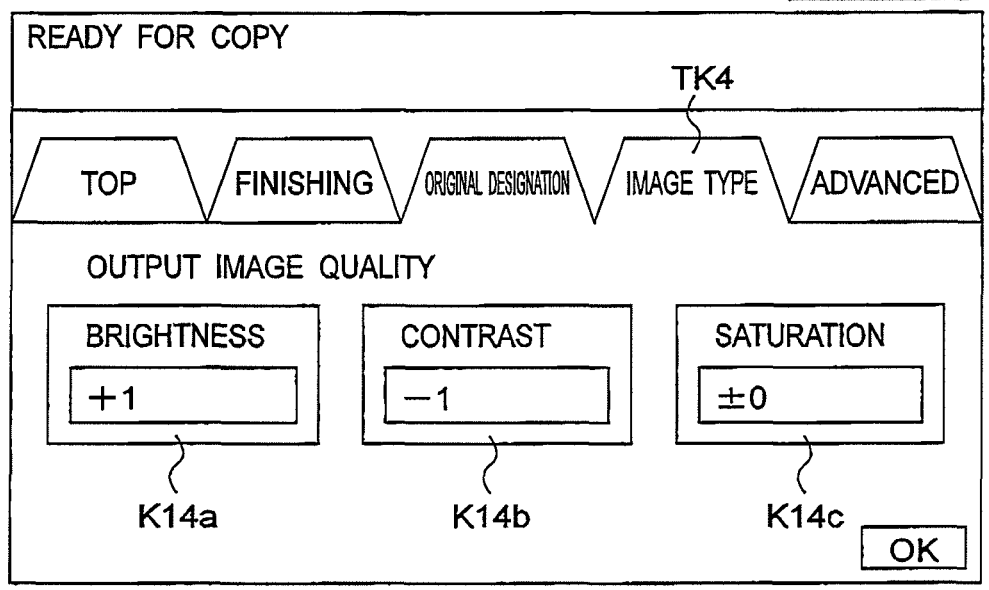

Fig.7E1
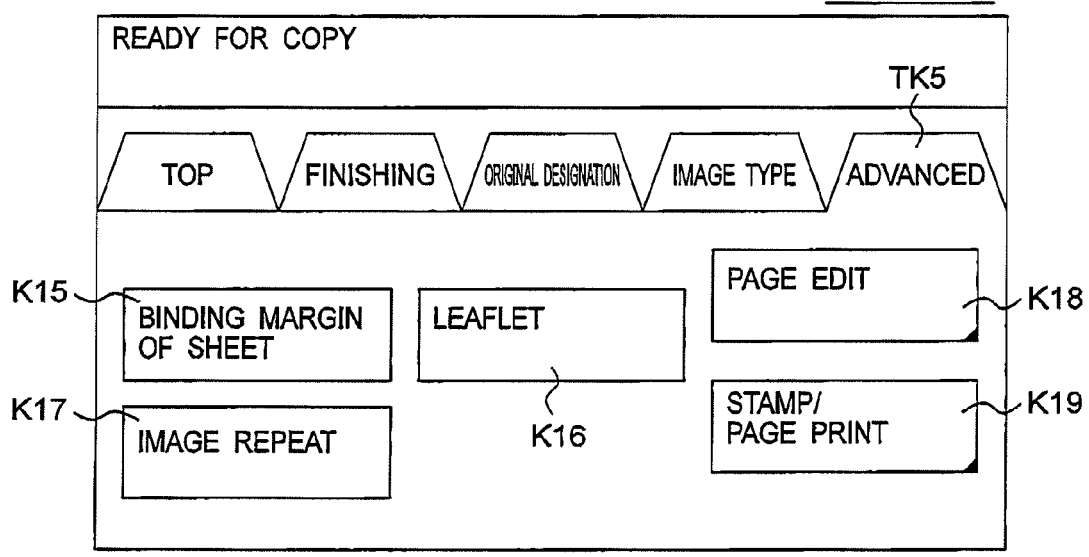
Fig.7E2
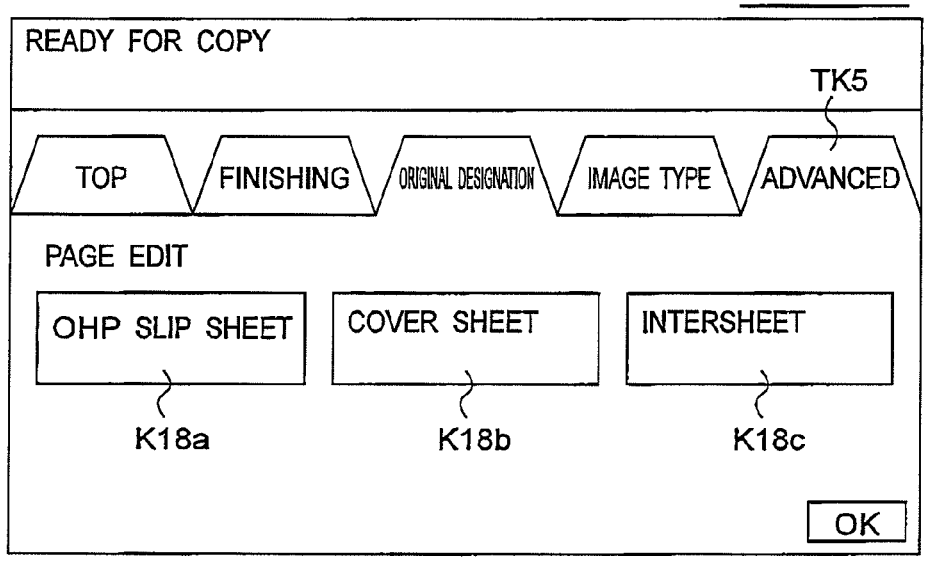

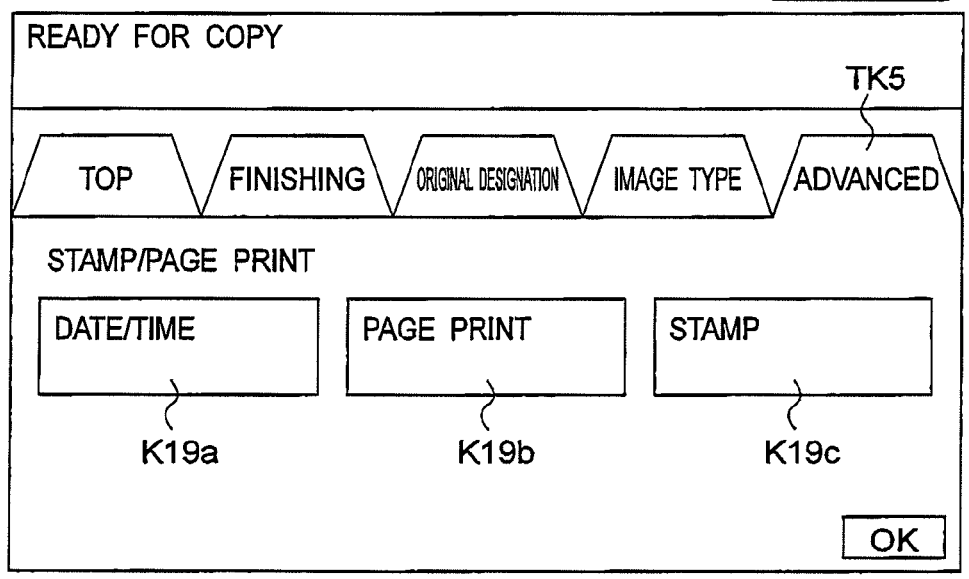
Fig.7E3
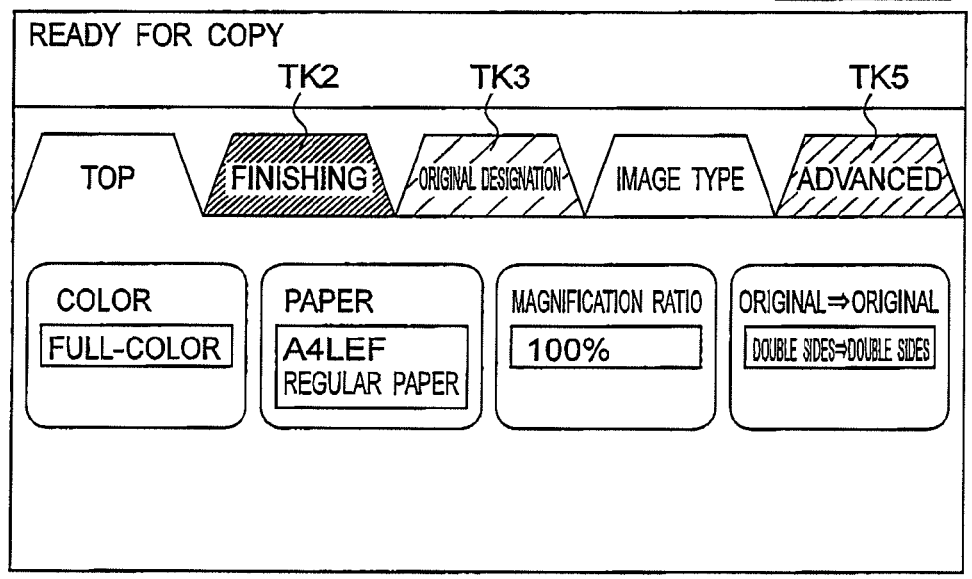
Fig.8A1

Fig.8A2

```
                                                    101 (103s)
┌─────────────────────────────────────────────────────┐
│ READY FOR COPY                                       │
│         TK2         TK3              TK5             │
│  TOP  FINISHING ORIGINAL DESIGNATION IMAGE TYPE ADVANCED │
│                                                      │
│  ORIGINAL⇒COPY          PAGE INTEGRATION             │
│    SINGLE SIDE⇒SINGLE SIDE    NONE                   │
│    SINGLE SIDE⇒DOUBLE SIDES   2 in 1                 │
│    DOUBLE SIDES⇒SINGLE SIDE   4 in 1/8 in 1          │
│    DOUBLE SIDES⇒DOUBLE SIDES  8 in 1          OK     │
└─────────────────────────────────────────────────────┘
```

Fig.8B

```
                                                    101 (103s)
┌─────────────────────────────────────────────────────┐
│ READY FOR COPY                                       │
│         TK2         TK3              TK5             │
│  TOP  FINISHING ORIGINAL DESIGNATION IMAGE TYPE ADVANCED │
│                        STAPLE      PUNCH             │
│   NON SORT             NONE        NONE              │
│   SORT                 CORNER      TWO HOLES         │
│   GROUP                TWO POINTS  THREE HOLES       │
└─────────────────────────────────────────────────────┘
```

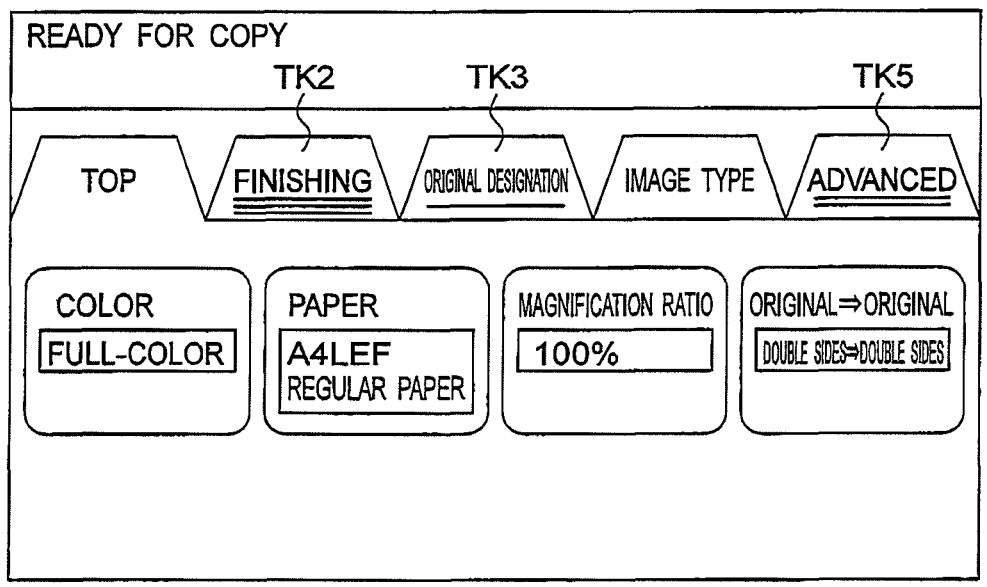
Fig.9A1
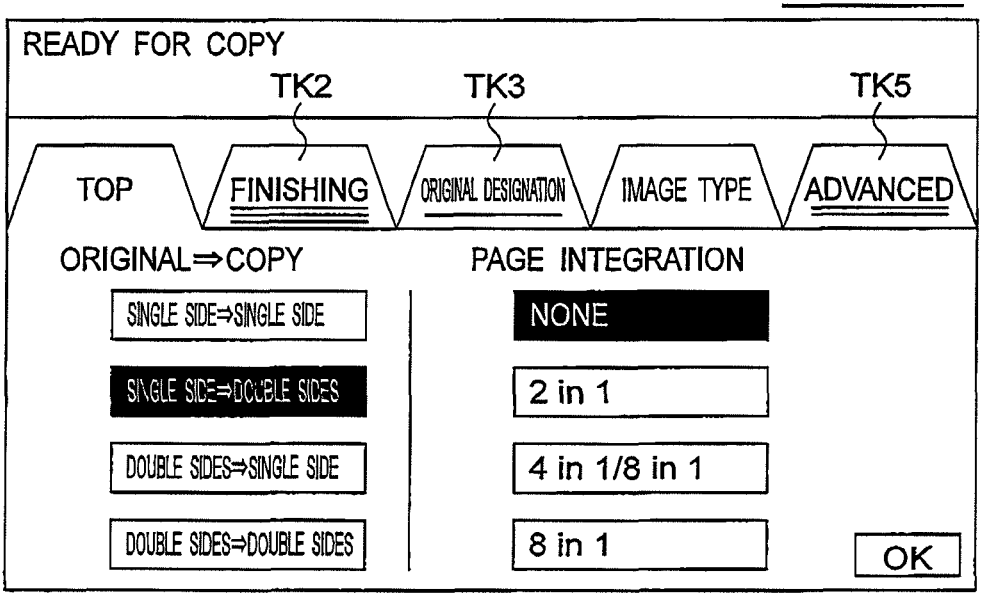
Fig.9A2

Fig.9D
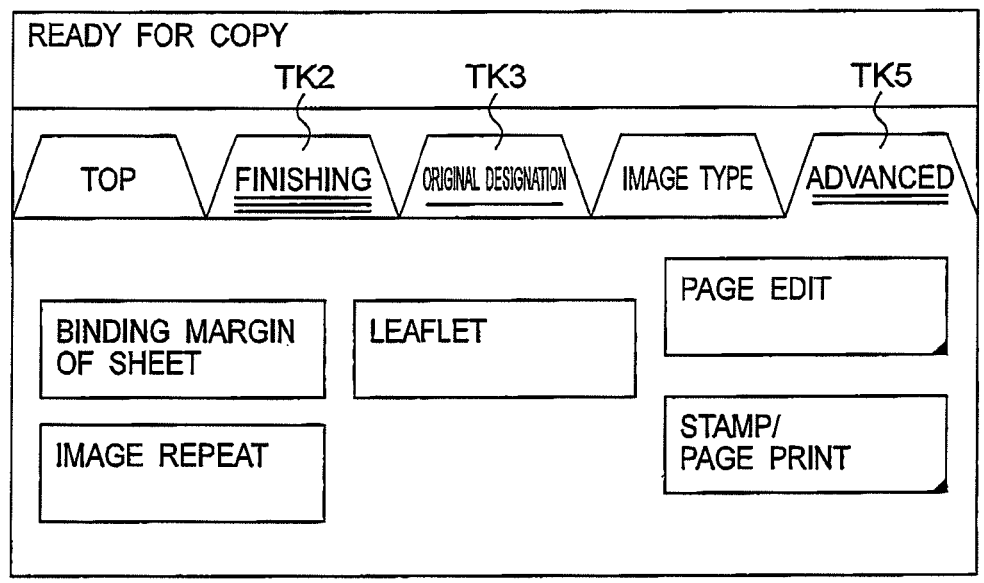
Fig.10A1
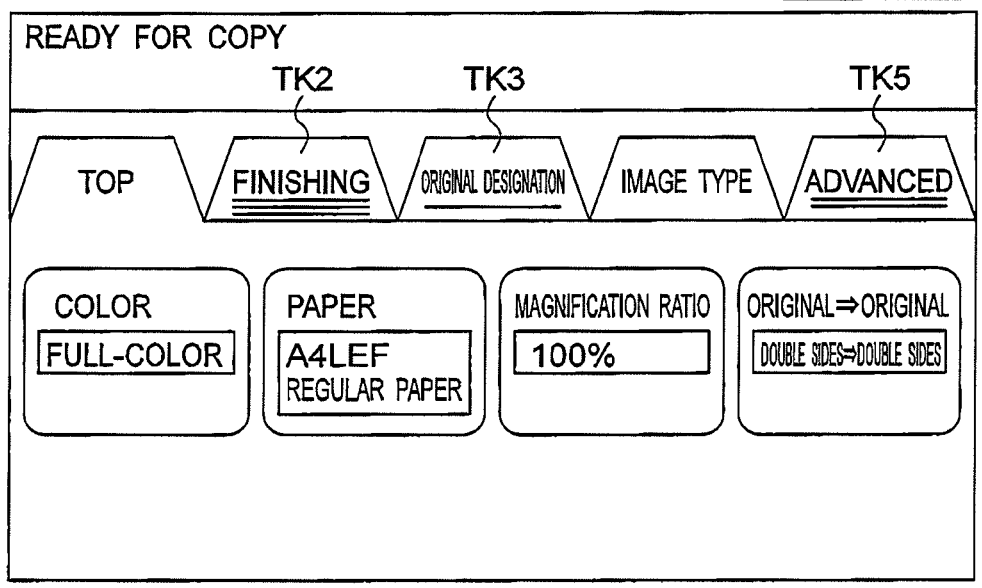

READY FOR COPY

TK2  TK3  TK5

TOP / FINISHING / ORIGINAL DESIGNATION / IMAGE TYPE / ADVANCED

ORIGINAL⇒COPY

- SINGLE SIDE⇒SINGLE SIDE
- SINGLE SIDE⇒DOUBLE SIDES
- DOUBLE SIDES⇒SINGLE SIDE
- DOUBLE SIDES⇒DOUBLE SIDES

PAGE INTEGRATION

- NONE
- 2 in 1
- 4 in 1/8 in 1
- 8 in 1

READY FOR COPY

TK2  TK3  TK5

TOP / FINISHING / ORIGINAL DESIGNATION / IMAGE TYPE / ADVANCED

- NON SORT
- SORT
- GROUP

STAPLE
- NONE
- CORNER
- TWO POINTS

PUNCH
- NONE
- TWO HOLES
- THREE HOLES

Fig.10C
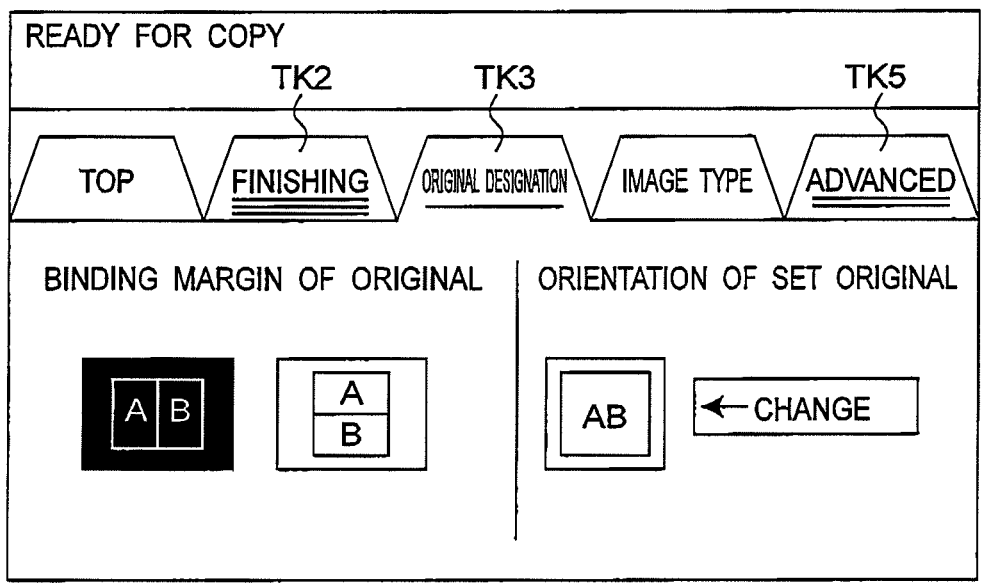
Fig.10D1
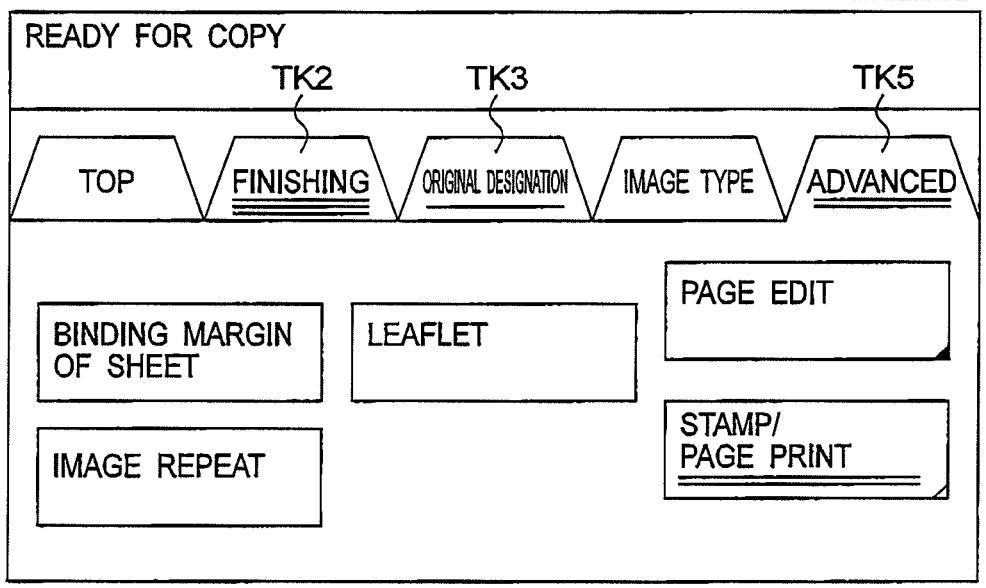

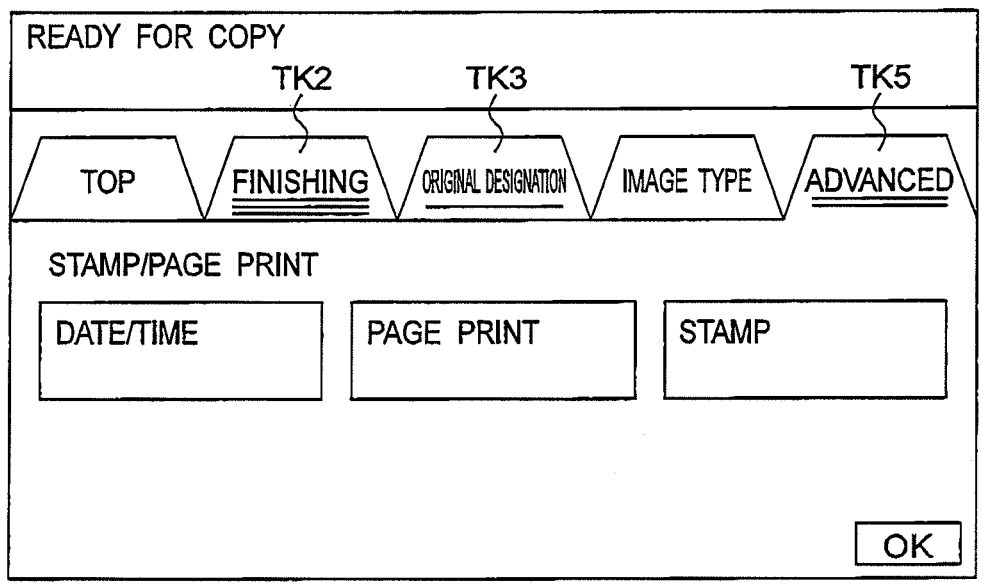
Fig.10D2
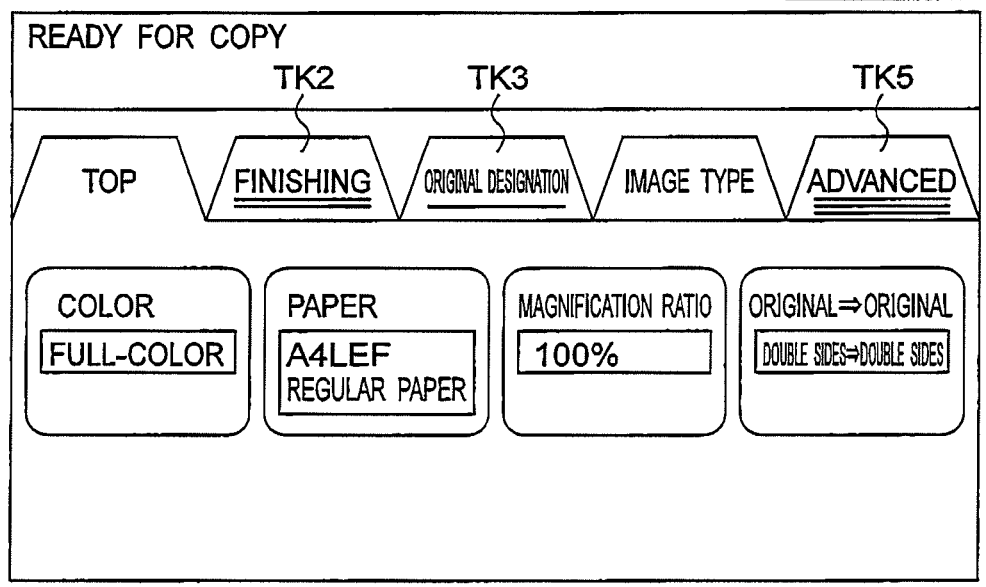
Fig.11A1

READY FOR COPY

TK2   TK3   TK5

TOP / FINISHING / ORIGINAL DESIGNATION / IMAGE TYPE / ADVANCED

ORIGINAL⇒COPY

- SINGLE SIDE⇒SINGLE SIDE
- SINGLE SIDE⇒DOUBLE SIDES
- DOUBLE SIDES⇒SINGLE SIDE
- DOUBLE SIDES⇒DOUBLE SIDES

PAGE INTEGRATION

- NONE
- 2 in 1
- 4 in 1/8 in 1
- 8 in 1

READY FOR COPY

TK2   TK3   TK5

TOP / FINISHING / ORIGINAL DESIGNATION / IMAGE TYPE / ADVANCED

- NON SORT
- SORT
- GROUP

STAPLE
- NONE
- CORNER
- TWO POINTS

PUNCH
- NONE
- TWO HOLES
- THREE HOLES

Fig.11C
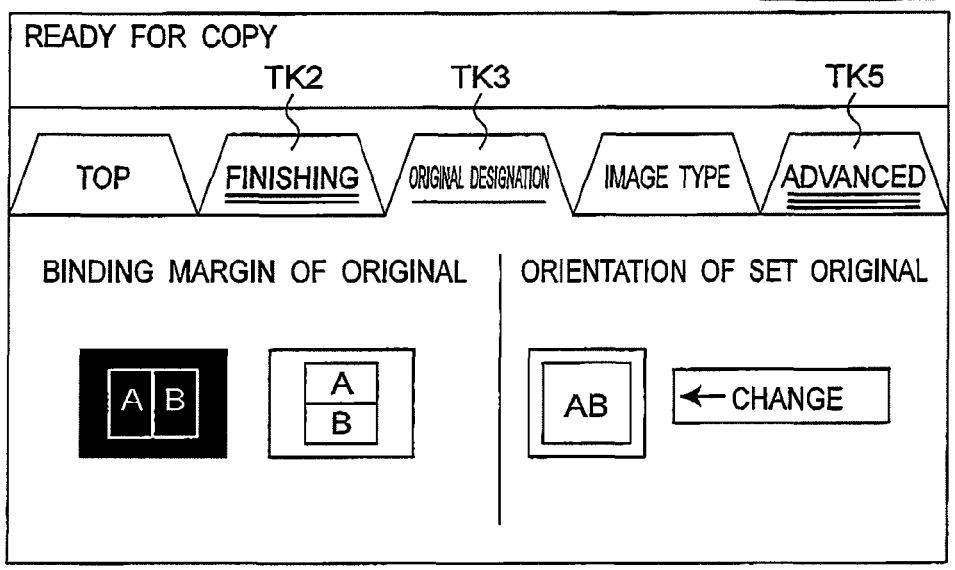
Fig.11D1
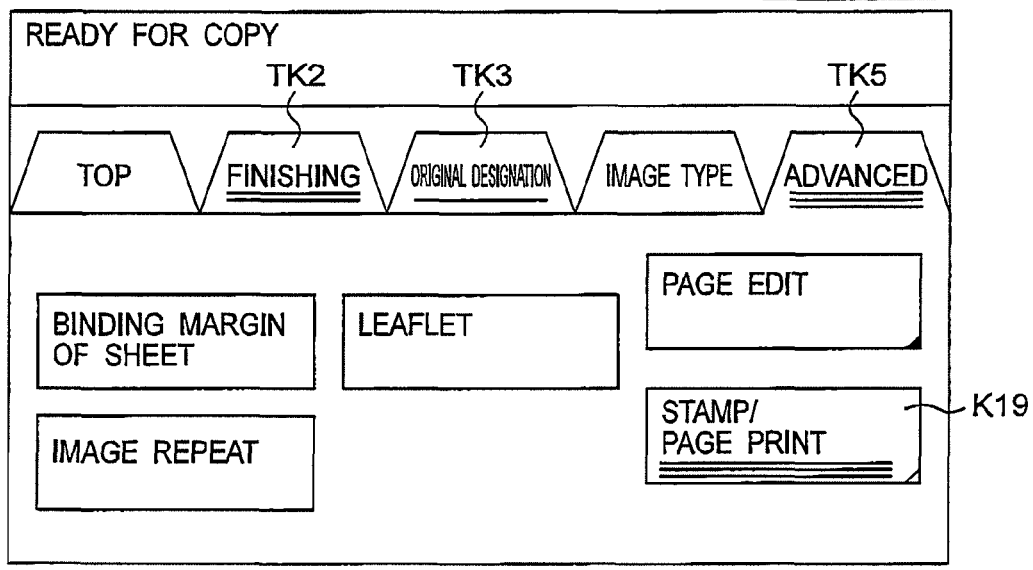

Fig.11D2
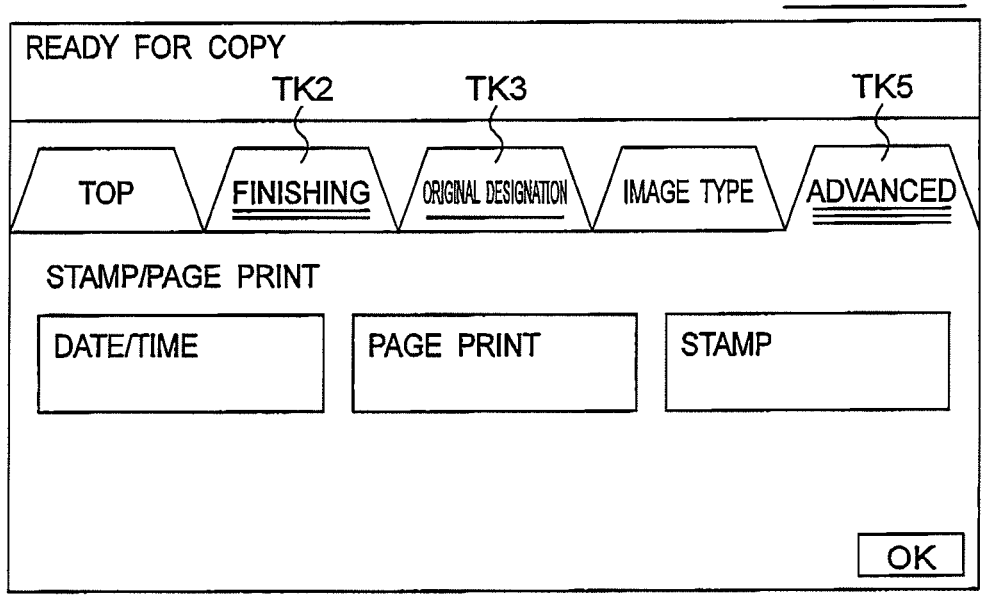

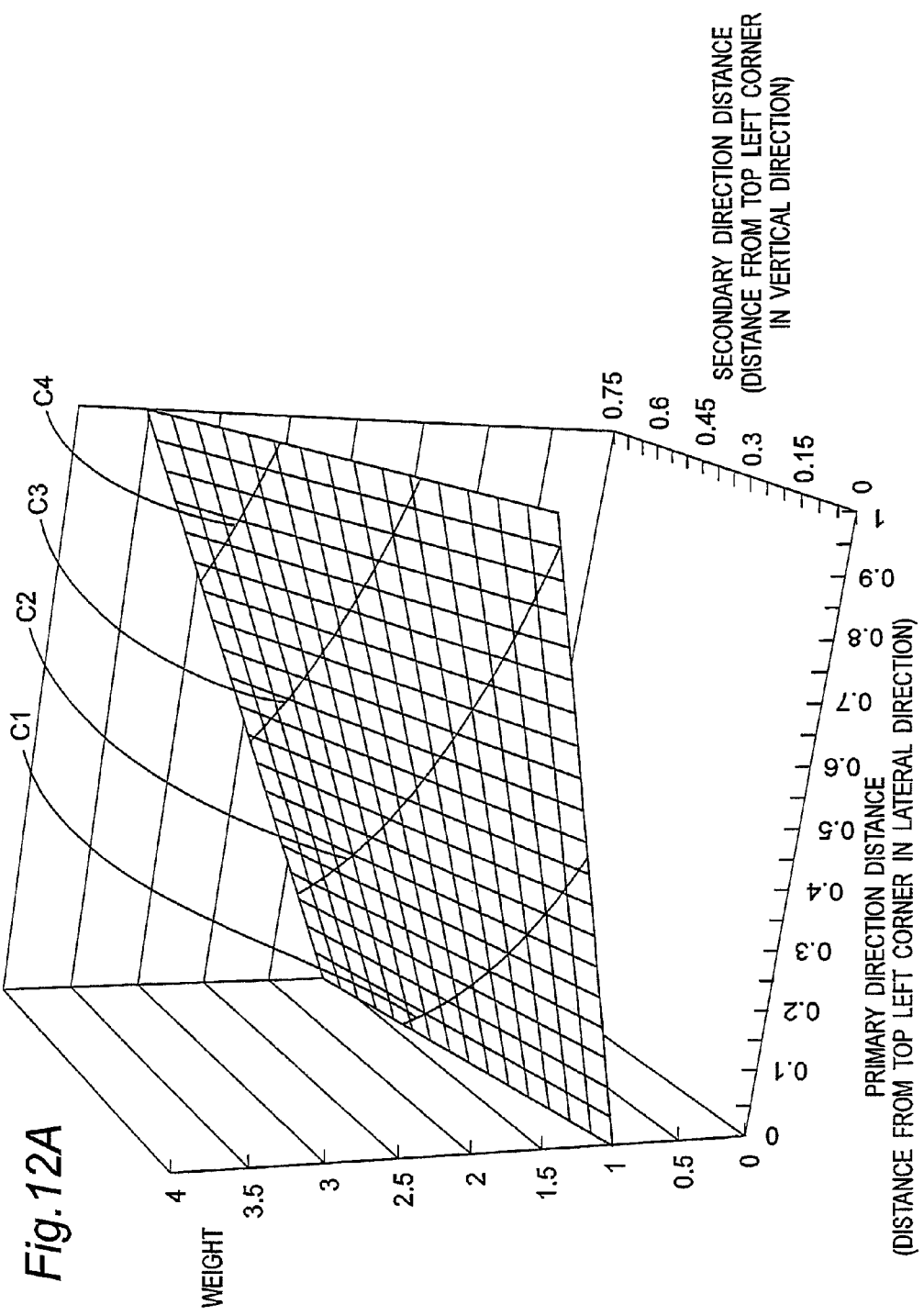

USER INTERFACE DEVICE

This application is based on an application No. 2009-069943 filed in Japan, the contents of which are hereby incorporated by reference.

BACKGROUND OF THE INVENTION

1. Field of the Invention

The present invention relates to a user interface device, and more particularly, to a user interface device which graphically displays a plurality of operation keys in a display screen and thereby configures an input unit.

2. Description of the Related Art

It is desirable that a user interface device of an apparatus used by a plurality of users, such as an image processing apparatus placed in an office, is equally friendly to all users.

Examples of such an image processing apparatus include a digital complex machine. A typical digital complex machine (hereinafter, also referred to as an "MFP" (MultiFunction Peripheral)) is configured to intensively include a plurality of types of image processing functions such as a scanner function, a photocopier function, a facsimile function, and a mailer function.

As being multi-functional, a user interface device of the MFP naturally requires a number of operation keys, sliders, and the like. However, in a typical conventional MFP, not all of operation input items (setup items) are provided with corresponding single purpose keys. With the conventional MFP, a space-saving user interface device is realized by assigning a single operation key with functions for inputting for a plurality of items by an action of a control mechanism and changing an item that can be inputted through the key according to the situation, by showing or hiding a necessary or unnecessary operation key on a display device such as a liquid crystal display according to the situation, and such.

Many of the conventional MFPs are provided with a liquid crystal display (referred to as "LCD", hereinafter) with a touch panel and a hardware key as a user interface device. In the MFP, the LCD with a touch panel serves as an output unit (display unit) and an input unit (software key) of the user interface. Alternatively, some of the MFPs are provided with a voice-based information input/output mechanism.

An amount of information that can be displayed in the LCD with a touch panel provided for the MFP is limited, as an area of a display plane thereof is limited. Accordingly, it is not possible to simultaneously display all operation keys corresponding to operation input items that the MFP is expected to accept.

Accordingly, the operation keys (software keys) on the LCD corresponding to the operation input items are categorized according to a predetermined criterion and classified into groups such that a single group of software keys in the same category constitutes a single input screen, and one of the input screens is selectively displayed on the LCD. In this case, software keys looking like index tabs, for example, are often displayed on the LCD with a touch panel so that a user can selectively call an input screen. Further, each of the input screens corresponding to the classified groups as described above is often provided with an additional operation key for moving to a setup detail input screen for setting details of a predetermined operation. In this case, the input screen of the user interface device has a hierarchical structure.

The classification into groups and the hierarchization of the operation keys (software keys) as described above facilitate the user's input for an operation input item included in one category with a limited display plane of the LCD. However, the operation input item that the user wishes to input is not necessarily included in the same category or the same hierarchical level. Rather, the operation input item that the user wishes to input is often included in a different input screen or a different hierarchical level. Therefore, there is a concern that providing a plurality of input screens based on the categorization and classification into groups and the hierarchical levels can result in unfriendliness of operability.

For example, the operability problem occurs in a situation where the MFP is used to copy a landscape document (an original document placed such that a long side of the document is in a horizontal direction, that is, a document whose side of document carrying direction within the MFP is longer than its side vertical to the carrying direction). In this case, if the user wishes, in the copy output processing, to set double-sided copying, add a binding margin to a copied matter, and further carry out punching processing, for example, the user is required to move between input screens of different category groups or in different depth of hierarchical levels to input the settings. This is far from a user-friendly operation.

However, the number of possible combinations of the operation keys (software keys) that are used to input operations and settings by the user to complete a single job is huge and enormous, and preparing input screens corresponding to all types of jobs in advance can further increase complexity of each input screen and the hierarchical structure among the screens. Therefore, this is not considered to be a practical solution.

There has also been proposed an idea of providing a wizard-type setup input flow for a plurality of setup items that are possibly used for setting of a single job so that the user can use. In this case, however, it is required to provide a vast number of wizards. As providing a large number of wizards requires a huge amount of manpower for development, this approach is also not considered to be a practical solution.

JP 2006-343842 A discloses an electronic device, a program, and a recording medium that outputs guidance so that, when an erroneous input to the electronic device is detected in a series of user operation, the user can correct the erroneous input appropriately. Specifically, the invention according to JP 2006-343842 A aims to reduce a burden of the user to correct his/her input error occurred in the operation.

For example, the electronic device disclosed in JP 2006-343842 A is provided with an error detection unit that detects an error when an operation corresponding to a series of user operation that has been accepted is not feasible, a prediction unit that predicts a content of operation intended by the user based on the series of user operation that has been accepted when the error is detected by the error detection unit, and a guidance output unit that guides the user to carry out an operation that corresponds to the content of operation that has been predicted by the prediction unit.

In JP 2006-343842 A, when the error detection unit detects an error, a ready lamp is turned off, for example. The user first learns an occurrence of the error from the lamp turned off. Then, according to the invention of JP 2006-343842 A, when such an error occurred, a guidance regarding operation necessary for solving the error is displayed automatically or by receiving a press down of a help key. Contents of messages shown in the guidance vary between errors even if the errors are of the same type when the corresponding contents of series of user operation are different. In this manner, according to the invention of JP 2006-343842 A, the user is guided so that the user can select an operation that should be carried out to correct the error.

As described above, the invention according to JP 2006-343842 A improves appropriateness of contents of hints to solve an error that are provided for the user when the error occurs. In other words, the invention according to JP 2006-343842 A notifies the user of the operation that should be carried out by the user to solve the error. However, according to this invention, the guidance is displayed in a message box, but does not indicate the operation key that should be actually operated by the user to solve the error. Accordingly, the user must find out by oneself an operation key that should be operated to solve the error.

Moreover, the invention according to JP 2006-343842 A does not indicate location of an operation key that should be used for setting a function that the user intends in a state in which no error is occurring (normal state). In the normal state, the user must find out an operation key necessary for setting a function that the user desires through a plurality of input screens and a hierarchical structure.

In a conventional user interface device, operation keys are categorized and classified into groups according to their functions (contents of operation and setting). An input screen is prepared to include each group, and the input screens are hierarchically structured. Therefore, a user is often required to switch between the input screens for using operation keys of different categories and to go through the screens in the hierarchical structure for using an operation key provided for an input screen located deep in the hierarchical structure.

Accordingly, with the conventional user interface device, the user often fails to find out the location of an operation key that the user desires to use.

SUMMARY OF THE INVENTION

In view of the above problems, it is an object of the present invention to provide a user interface device that allows a user to easily find out location of an operation key through a series of input operation.

In one aspect of the present invention, there is provided a user interface device which displays an operation key in a display unit using a predetermined design. The user interface device includes: a setting operation history storing unit that stores a setting operation history record in which a content of a setting operation carried out by a user for each of past jobs that have been executed is recorded; a setting operation history retrieving unit that retrieves the setting operation history record in which the content of the setting that is the same as a current content of the setting is recorded; a total number of operations calculating unit that calculates a total number of operations for each operation key based on the content of the setting recorded in the setting operation history record in which the same content of setting is recorded; and an operation key display type determining unit that estimates relative degrees of likelihood to be used by the user of the operation keys based on the total number of operations for each operation key, and determines, based on the estimation, a design to be used to display the operation key out of a group of designs including at least a first design for normal display and a second design for highlighted display.

In a further aspect of the present invention, there is provided a user interface method in a user interface device which displays an operation key in a display unit using a predetermined design. The method includes: storing by a setting operation history storing unit a setting operation history record in which a content of a setting operation carried out by a user for each of past jobs that have been executed; retrieving by a setting operation history retrieving unit the setting operation history record in which the content of the setting that is the same as a current content of the setting is recorded; calculating by a total number of operations calculating unit a total number of operations for each operation key based on the content of the setting recorded in the setting operation history record in which the same content of setting is recorded; and estimating by an operation key display type determining unit relative degrees of likelihood to be used by the user of the operation keys based on the total number of operations for each operation key, and determining, based on the estimation, a design to be used to display the operation key out of a group of designs including at least a first design for normal display and a second design for highlighted display.

In a yet further aspect of the present invention, there is provided a computer-readable medium having stored thereon computer executable instructions which, when executed by a computer of a user interface device which displays an operation key in a display unit using a predetermined design, perform: causing a setting operation history storing unit to store a setting operation history record in which a content of a setting operation carried out by a user for each of past jobs that have been executed is recorded; causing a setting operation history retrieving unit to retrieve the setting operation history record in which the content of the setting that is the same as a current content of the setting is recorded; causing a total number of operations calculating unit to calculate a total number of operations for each operation key based on the content of the setting recorded in the setting operation history record in which the same content of setting is recorded; and causing an operation key display type determining unit to estimate relative degrees of likelihood to be used by the user of the operation keys based on the total number of operations for each operation key, and to determine, based on the estimation, a design to be used to display the operation key out of a group of designs including at least a first design for normal display and a second design for highlighted display.

BRIEF DESCRIPTION OF THE DRAWINGS

The above and further objects and novel features of the present invention will more fully appear from the following detailed description when the same is read in connection with the accompanying drawings, and in which:

FIG. 6 is an example of a setting operation history record;

FIGS. 7A1, 7A2, 7B, 7C, 7D1, 7D2, 7E1, 7E2, and 7E3 are examples of displays of a user interface (first level of hierarchy of top input screen (7A1), second level of hierarchy of top input screen (7A2), finishing setup input screen (7B), original designation input screen (7C), first level of hierarchy of image type setup input screen (7D1), second level of hierarchy of image type setup input screen (output image type detail) (7D1), first level of hierarchy of advanced setting input screen (7E1), second level of hierarchy of advanced setting input screen (page edit detail) (7E2), and second level of hierarchy of advanced setting input screen (stamp/page print detail) (7E3));

FIGS. 8A1, 8A2, 8B, 8C, and 8D are examples of displays of the user interface (first level of hierarchy of top input screen (8A1), second level of hierarchy of top input screen (8A2), finishing setup input screen (8B), original designation input screen (8C), and first level of hierarchy of advanced setting input screen (8D));

FIGS. 9A1, 9A2, 9B, 9C, and 9D are examples of displays of the user interface (first level of hierarchy of top input screen (9A1), second level of hierarchy of top input screen (9A2), finishing setup input screen (9B), original designation input screen (9C), and first level of hierarchy of advanced setting input screen (9D));

FIGS. 10A1, 10A2, 10B, 10C, 10D1, and 10D2 are examples of displays of the user interface (top input screen, first level of hierarchy (10A1), second level of hierarchy of top input screen (10A2), finishing setup input screen (10B), original designation input screen (10C), first level of hierarchy of advanced setting input screen (10D1), and second level of hierarchy of advanced setting input screen (stamp/page print detail) (10D2));

FIGS. 11A1, 11A2, 11B, 11C, 11D1, and 11D2 are examples of displays of the user interface (first level of hierarchy of top input screen (11A1), second level of hierarchy of top input screen (11A2), finishing setup input screen (11B), original designation input screen (11C), first level of hierarchy of advanced setting input screen (11D1), and second level of hierarchy of advanced setting input screen (stamp/page print detail) (11D2)); and FIGS. 12A and 12B are charts of a weight value at an arbitrary position on the user interface.

Figure 1:
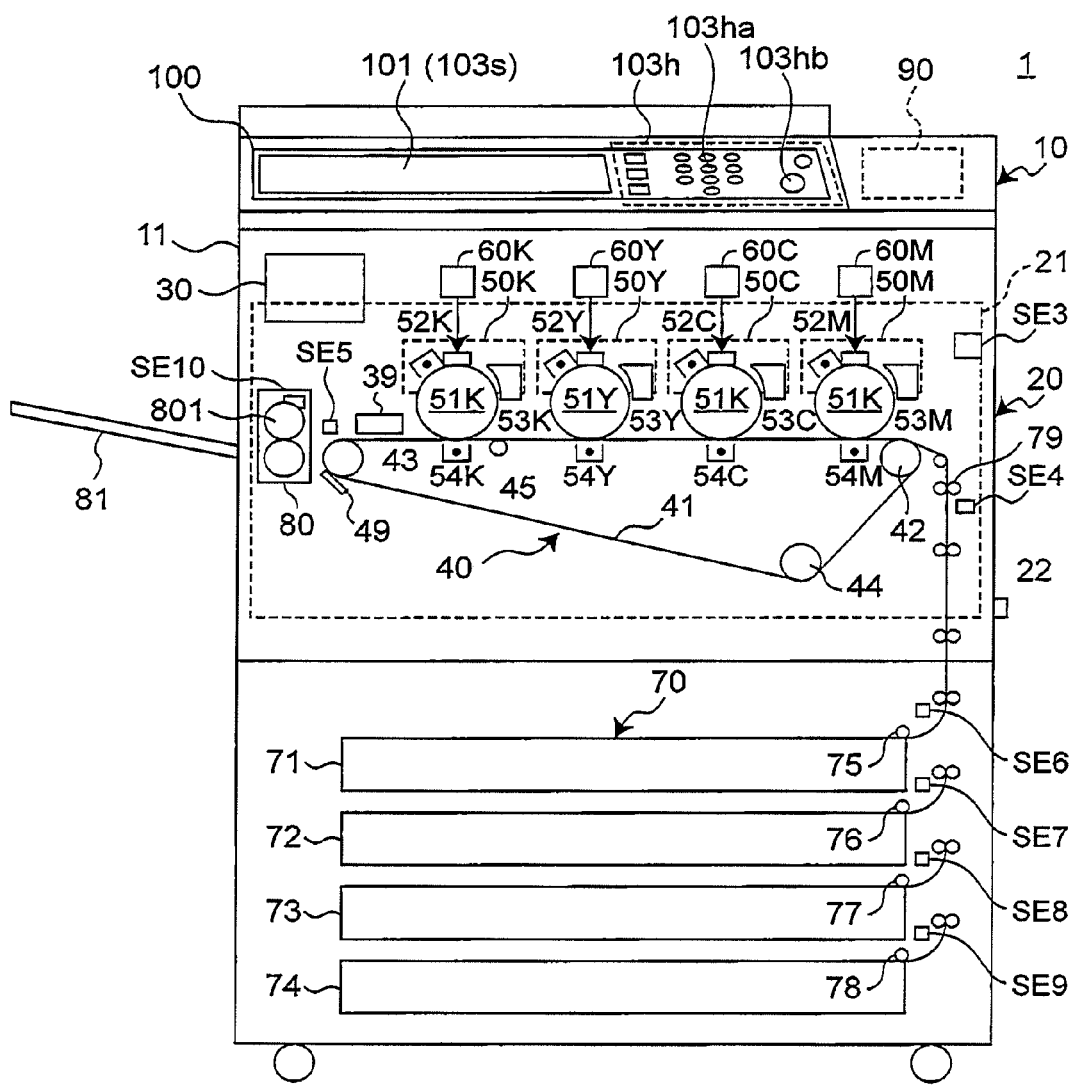
FIG. 1 is an elevation view of an internal structure of a digital complex machine provided with a user interface device according to an embodiment of the present invention.

It is to be expressly understood, however, that the drawings are for the purpose of illustration only and are not intended as definitions of the limits of the invention. Preferred embodiments of the present invention are described in more detail below referring to these accompanying drawings.

DETAILED DESCRIPTION OF THE PREFERRED EMBODIMENTS

The following describes an embodiment according to the present invention in detail.

The embodiment of the present invention is a user interface device (UI device) of a digital complex machine (MFP). The UI device of the MFP according to the present embodiment is provided with an LCD with a touch panel. As will be described below with reference to the drawings, this UI device is able to display a plurality of operation keys on the LCD. The operation keys are classified into predetermined category groups, each of which constitutes an input screen. Further, the input screens can be hierarchically structured, and in this case, a separate input screen is configured for each hierarchical level. The UI device senses pressing onto the touch panel and thereby accepts an input of an operation to each operation key by a user.

The UI device according to the present embodiment notifies users of the UI device with various different purposes of location of an operation key that each user would use next in a series of setting operation, without changing an arrangement of operation keys and a hierarchization structure of the operation keys in an input screen configured for each category group. With such a configuration, the UI device according to the present embodiment improves its operability and friendliness to the users who use the UI device.

Thus, the UI device according to the present embodiment carries out, based on a record (setting operation history record) such as information on an execution history (number of executions, for example) of past execution jobs (past jobs), information on the number of times at which a function setup item is set for each past job, a kind and a total number of function setup items included in a single category group, and an actual content of setting for each function setup item, an estimating of likelihood that the user would use each operation key (corresponding to each function setup item) in the current use; an estimating of the operation key that would be highly probably operated by the user; and a changing of a displayed mode on how the operation keys with high likelihood are displayed on the LCD based on the estimation of the likelihood. In this manner, with the UI device according to the present embodiment, the user can easily recognize location of an operation key to be used in a series of setting operation relating to an arbitrary job. Further, the UI device according to the present embodiment can improve accuracy of estimation of likelihood by carrying out a predetermined weighting calculation to each value included in the setting operation history record (also referred to as "history record", hereinafter) in the step of estimating likelihood based on the history record.

FIG. 1 is a diagram of an entire configuration of an MFP 1 having a user interface device 100. As shown in FIG. 1, the MFP 1 is provided with an image reader unit 10 that reads an original image, a printer unit 20 that prints and reproduces the image that has been read on a recording sheet, and the user interface device 100.

The image reader unit 10 is a known device that reads an image of an original placed on a document glass plate (not shown) using a scanner. An original image obtained by radiating light from an exposure lamp provided for the scanner is provided as an image through a collecting lens, and further dispersed into three types of light with different wavelengths of red (R), green (G), and blue (B) by a spectrograph, respectively entering into a CCD imaging sensor for red, a CCD imaging sensor for green, and a CCD imaging sensor for blue.

An output signal from each CCD imaging sensor (hereinafter referred to as a "CCD sensor") goes through an A-D conversion, and image data pieces for R, G, and B of the original are thereby obtained.

The image data pieces for the corresponding color components obtained by the image reader unit 10 go through various data processing by a control unit 30, and are further converted into image data pieces of respective reproduction colors including cyan (C), magenta (M), yellow (Y), and black (K) (hereinafter, the reproduction colors of cyan, magenta, yellow, and black are represented as C, M, Y, and K, and reference numerals of components relating to the reproduction colors are suffixed with C, M, Y, and K, respectively).

The image data pieces are stored in a storage area within the control unit 30 for each reproduction color, and, after necessary image correction for positional misalignment correction is applied, are read for a single scanning line to constitute driving signals of a laser diode in synchronization with feed of the recording sheet.

The printer unit 20 forms an image using a known electrophotographic technology, and is provided with a recording sheet carrier unit 40 in which a transfer belt 41 is suspended, image processing units 50M to 50K respectively corresponding to the colors of M, C, Y, and K disposed facing toward the transfer belt 41 at a predetermined interval from a upstream side in the recording sheet carrying direction (hereinafter simply referred to as "upstream side") to a downstream side in the carrying direction (hereinafter simply referred to as "downstream side"), scanning exposure units 60M to 60K provided for the corresponding image processing units, a paper feeding unit 70 that feeds the recording sheet to the upstream side of the recording sheet carrier unit 40, and a fuser unit 80 disposed on the downstream side.

Each of the scanning exposure units 60M to 60K includes a laser diode that emits a laser beam upon reception of the driving signal outputted from the control unit 30, and a polygon mirror that deflects the laser beam to exposure-scan over a corresponding one of photoreceptor drums 51M to 51K along a main scanning direction. The image processing units 50M to 50K are respectively constituted by the photoreceptor drums 51M to 51K, electrostatic chargers 52M to 52K disposed around the photoreceptor drums 51M to 51K, development units 53M to 53K, transfer chargers 54M to 54K and the like, and are unitized and contained in a single casing for ease of maintenance.

The paper feeding unit 70 includes paper feed trays 71 to 74 each containing a recording sheet of a different size, pick-up rollers 75 to 78 that each pay out the recording sheet from the corresponding paper feed tray, a resist roller 79 that adjusts the timing of feeding to the transfer belt 41, and further includes sensors 710 to 740 each detecting presence or absence of the recording sheet and a state of being pulled out or set of the paper feed tray.

The photoreceptor drums 51M to 51K are uniformly electrically-charged by the electrostatic chargers 52M to 52K after remaining toner on their surfaces is removed by a cleaner (not shown) and electricity is removed by radiation from an eraser lamp (also not shown) before the exposure. When exposed by the laser beam in such a uniformly electrically charged state, electrostatic latent images are formed respectively on the surfaces of the photoreceptor drums 51M to 51K. Each electrostatic latent image is developed by one of the development units 53M to 53K of the corresponding color. Accordingly, toner images of M, C, Y, and K are formed on the respective surfaces of the photoreceptor drums 51M to 51K, and are sequentially transferred on the recording sheet carried by the recording sheet carrier unit 40 at each transfer position based on an electrostatic action of the transfer chargers 54M to 54K disposed on a back side of the transfer belt 41.

At this time, operations for forming the images of the corresponding colors are carried out at different timing from the upstream side to the downstream side so that the toner images are transferred overlappingly to the same position on the recording sheet that is being carried. The recording sheet on which the toner images of the corresponding colors are transferred in a multi-layered manner is then carried to the fuser unit 80 by the transfer belt 41. A fuser roller 801 of the fuser unit 80 is provided with an internal heater, and the control unit 30 controls power distribution to the internal heater while detecting a surface temperature of the fuser roller 801 with a temperature detecting sensor SE10 to maintain the temperature at a predetermined fusing temperature. The recording sheet is pressurized at this point at a high temperature, and after toner particles on its surface are fused and fixed to the surface of the sheet, the recording sheet is discharged onto a catch tray 81. The fuser unit 80 is configured as a replaceable unit (hereinafter referred to as a fusing unit).

A cleaning blade 49 is disposed at a position almost immediately below a driven roller 43. The cleaning blade 49 is brought into contact with a surface of the transfer belt 41, and removes a toner of a resist mark transferred to the transfer belt 41 when detecting an amount of positional misalignment as will be later described. The operation panel (user interface device) 100 is disposed on a front surface of the image reader unit 10 which is a position easy to operate, and an operator can make a key input for such as instructing to start copying, setting the number of copy, and specifying a printing mode using this panel. The user interface device 100 is provided with a display unit 101 constituted by the liquid display panel (LCD panel), in which copy mode been set by the operator and various messages are displayed.

Further, a front door 21 that can be opened and closed is provided for a front surface portion of the printer unit 20 of a housing 11, so that, when a paper jam occurs in a paper carrying system, a jammed paper sheet can be removed by opening the front door, or so that maintenance such as refilling of the toner can be done. When the front door 21 is opened, a door open detecting sensor SE3 constituted by a limit switch and a slide switch detects the opening of the door, and the detection signal is transmitted to the control unit 30. Remaining sensors SE4 to SE9 are jam sensors that are constituted by a reflective photoelectric sensor, a limit switch and the like. The control unit 30 determines that a paper jam has occurred when none of the jam sensors SE3 to SE9 detects a posterior edge of the recording sheet that is being transferred after a predetermined time has passed since an anterior edge of the recording sheet has been detected, or when a jam sensor on the downstream side fails to detect the anterior edge of the recording sheet after a predetermined time has passed since the jam sensor on the upstream side has detected the posterior edge of the recording sheet.

Moreover, a main power switch 22 is provided substantially at a central position on a right side surface of the housing 11.

The recording sheet carrier unit 40 is constituted by the transfer belt 41, a driving roller 42 over which the transfer belt 41 extends, the driven roller 43, a tension roller 44, an auxiliary roller 45 and the like.

The driving roller 42 is rotatably held at a right end portion of a swing frame 46 that is held swingable upward and downward about a rotary axis of the driven roller 43. The driving roller 42 is rotary driven by a stepper motor (not shown) provided for the swing frame 46. A rotary speed of the driving roller 42 is controlled by the control unit 30 such that a speed of a carrying surface of the transfer belt 41 is the same as a circumferential speed (system speed) of the photoreceptor drums 51M to 51K.

In a color printing mode, all of the photoreceptor drums 51M to 51K are brought into contact 25, with the recording sheet carrying surface of the transfer belt 41. On the other hand, in a single color printing mode, the photoreceptor drums 51M to 51Y that do not involve the image formation are spaced apart from the carrying surface of the transfer belt 41.

In this manner, even if the photoreceptor drums 51M to 51Y are stopped in the single color printing mode, no friction occurs between the photoreceptor drums 51M to 51Y and the transfer belt 41. Accordingly, it is possible to prevent a photosensitive surface of the photoreceptor drum and components around the photoreceptor drum from unprofitably wearing without negatively affecting the image formation.

Each photoreceptor drum is also configured as a replaceable unit (hereinafter referred to as an imaging unit).

<Hardware Configuration of UI Device>

Figure 2:
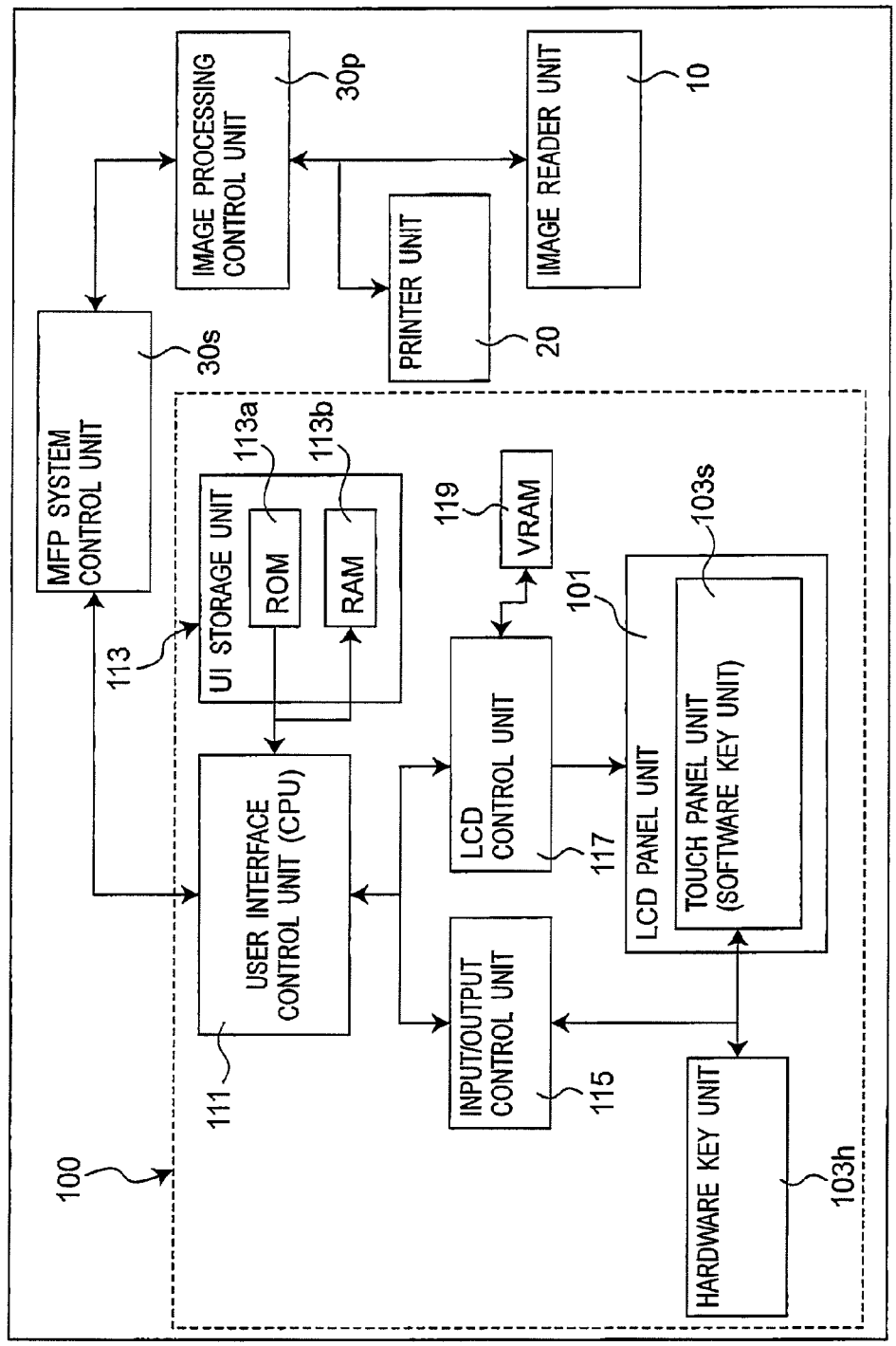
FIG. 2 is a block diagram of a hardware configuration of the digital complex machine provided with the user interface device according to the embodiment of the present invention.

FIG. 2 is a block diagram of a hardware configuration of an operation unit (user interface device 100) of the MFP 1.

The user interface device (hereinafter also referred to as "UI device") 100 includes a central processing unit (user interface control unit) 111 that controls the UI device 100 as a whole. The user interface control unit (hereinafter also referred to as "UI control unit") 111 is connected to an MFP system control unit 30s that controls the MFP 1 as a whole so as to be able to communicate with the MFP system control unit 30s.

Further, the UI device 100 includes a user interface storage unit 113 that is a data storage area. The user interface storage unit (hereinafter also referred to as "UI storage unit") 113 is provided with a read only memory (ROM) 113a that stores a UI device control program executed by the UI control unit 111 and data of an image (data of a design for an operation key, for example) to be displayed in the display unit (LCD panel unit) 101, and a random access memory (RAM) 111b that the UI control unit 111 uses as a working memory.

The UI device 100 further includes an LCD control unit (LCD controlling CPU) 117 that controls the display unit (LCD panel unit) 101. The LCD control unit 117 controls reading from and writing to a video memory (VRAM) 119 and carries out an image display control of the display in the display unit (LCD panel unit) 101. Specifically, the image data stored in the ROM 113 such as a design of the operation key is transmitted from the UI control unit 111 to the LCD control unit 117 and stored in the VRAM 119, and then read from the VRAM 119 and outputted to the display unit (LCD panel unit) 101 by the LCD control unit 117.

Further, the LCD panel unit 101 is integrated with a touch panel unit 103s, and when the user touches the touch panel unit 103s, information of a position touched by the user is transmitted to the UI control unit 111 through an input/output control unit 115 (also referred to as "I/O control unit", hereinafter). The touch panel unit 103s constitutes an input unit (software key) of the UI device 100. The UI control unit 111 recognizes operations such as pressing of an operation key or the like based on the received information of the position, and carries out a process that corresponds to a content of operation or setting and the like by the user.

A hardware key unit 103h is also controlled by the I/O control unit 115. The hardware key unit 103h is configured as a hardware key constituted by a number keypad (103ha of FIG. 1), a start key (103hb of FIG. 1), a panel reset key and the like, as well as by an LED that indicates a state of the machine, a buzzer that notifies the user of reception of an input made via the hardware key 103h and the software key 103s, and the like.

Further, the I/O control unit 115 communicates with the MFP system control unit 30s via the UI control unit 111 as needed. For example, when the user presses down the start key of the hardware key unit 103h, information relating to this pressing is communicated to the MFP system control unit 30s via the I/O control unit 115 and the UI control unit 111, and thereby starting a job (a series of copying operation, for example).

A status such as near-end of lifetime or end of lifetime of the units including the fusing unit and an imaging unit of each color is determined by the number of uses (life counter) in copying and printing.

Each unit backs up the number of uses as a counting value, and notifies the MFP system control unit 30s of its status based on the counting value.

Then, at the time when the job is being executed or completed, contents of a mode relating to the execution of the job (such as setup content and information of operation keys that are used) are saved in the UI storage unit 113 as a setting operation history record. The destination for saving the record may be a storage area in the MFP system control unit 30s of a main body of the MFP 1. Alternatively, the destination for saving the record may be a removable medium such as an HDD, or, when the MFP 1 is connected to a network, may be a server under the MFP 1.

<Functional Configuration of UI Device>

Figure 3:
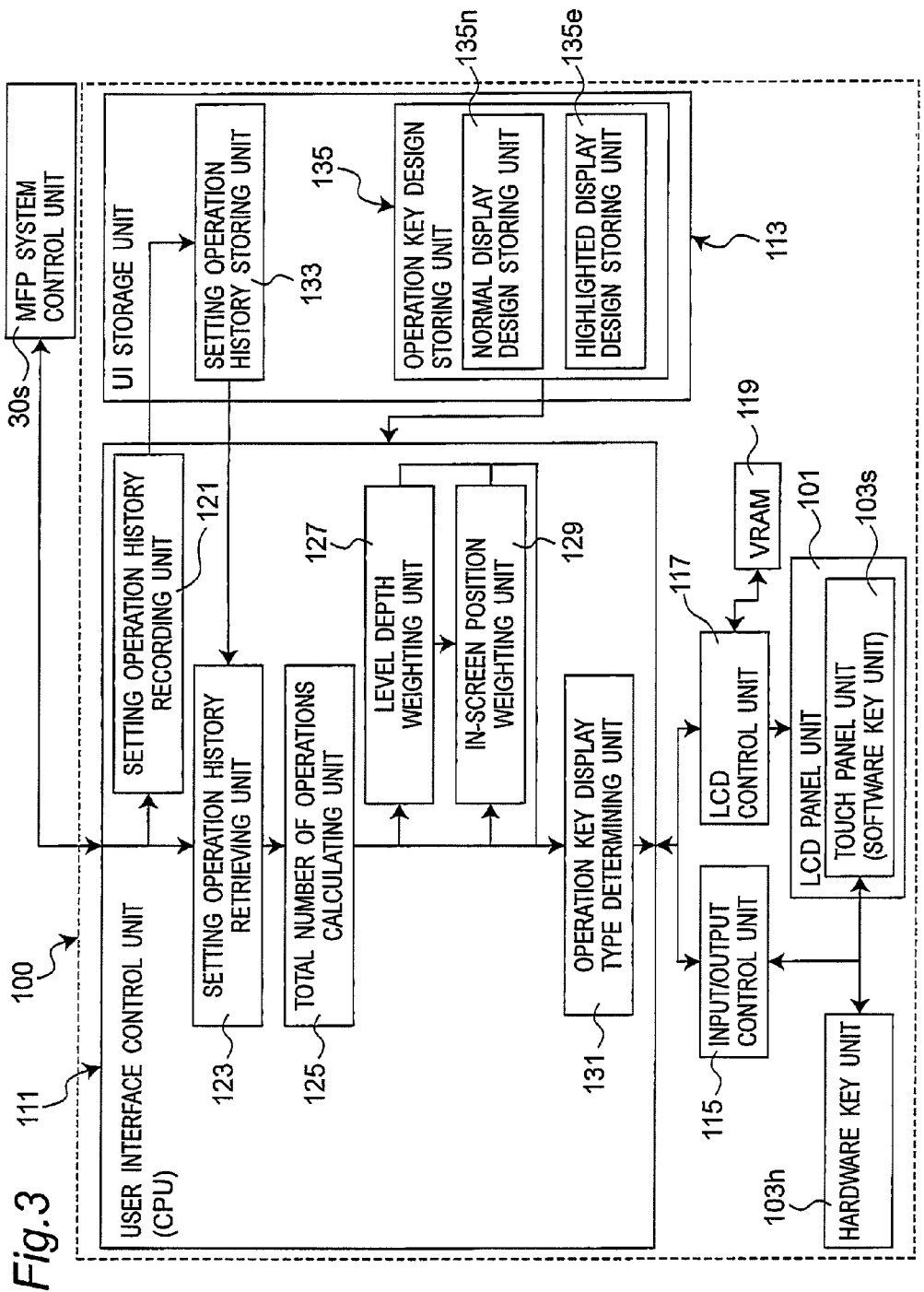
FIG. 3 is a block diagram of a functional configuration of the digital complex machine provided with the user interface device according to the embodiment of the present invention.

FIG. 3 is a block diagram of a functional configuration of the UI device 100. The functions shown in this figure are realized by an action of a computer program executed by the UI control unit 111, and an action of the hardware components that work under the control of the UI control unit 111. The computer program is desirably held in the UI storage unit 113, but can be held in the storage area of the main body of the MFP 1, or in a storage area of a storage device external to the MFP 1. Further, a component other than the UI control unit 111 may execute the computer program. The computer program can be executed by a central processing unit of the main body of the MFP 1, or by a central processing unit external to the MFP 1.

The UI control unit 111 executes the computer program to realize the following functions: a setting operation history recording unit 121 (also referred to as "recording unit", hereinafter) that records the contents, the number of times and the like of setting operations (modifying a setting value from a default value, for example) as the history record in the setting operation history storing unit 133 (also referred to as "history storing unit", hereinafter) of the UI storage unit 113; a setting operation history retrieving unit 123 (also referred to as "retrieving unit", hereinafter) that obtains (retrieves) the history record stored in the history storing unit 133 of the UI storage unit 113; a total number of operations calculating unit 125 (also referred to as "calculating unit", hereinafter) that calculates a total number of operations of each setting operation based on the obtained history record; a level depth weighting unit 127 that carries out a weighting calculation to the total number of operations calculated for each setting operation based on a depth of the level at which an operation key for the setting operation is provided; an in-screen position weighting unit 129 that carries out a weighting calculation to the total number of operations calculated for each setting operation based on a position within the display screen of the LCD panel unit 101 at which the operation key for the setting operation is provided; and an operation key display type determining unit 131 (also referred to as "determining unit", hereinafter) that determines a display mode for displaying each operation key in the display screen of the LCD panel unit 101 based on at least one of a value of the total number of operations outputted by the calculating unit 125, a value of the depth weighted total number of operations outputted by the level depth weighting unit 127, and a value of the position weighted total number of operations outputted by the in-screen position weighting unit 129.

Further, the UI storage unit 113 includes, in addition to the storage for the computer program, the history storing unit 133 that holds the history record, and an operation key design storing unit 135 (also referred to as "design storing unit", hereinafter) that holds the image data of the operation key design used when displaying the operation key in the LCD panel unit 101. The design storing unit 135 holds at least two designs for each operation key. The first design is an operation key design for normal display (an operation key display mode when the result of the likelihood estimation described above for this operation key is not relatively higher than the results for other operation keys). The second design is an operation key design for a highlighted display (an operation key display mode when the result of the likelihood estimation described above for this operation key is relatively higher than the results for other operation keys). The determining unit 131 determines whether the operation keys should be displayed in the normal display mode or in the highlighted display mode in the LCD panel unit 101, and obtains the data for the corresponding operation key design from the UI storage unit 113 and transmits the data to the LCD control unit.

The LCD control unit 117 carries out display processing of the operation keys (software keys) in the LCD panel 101 according to an instruction from the UI control unit 111.

The I/O control unit 115 outputs to the UI control unit 111 information regarding the operation by the user, upon reception of an input from the hardware key unit 103h and the software key unit 103s.

<Process Flow Chart>

Figure 4:
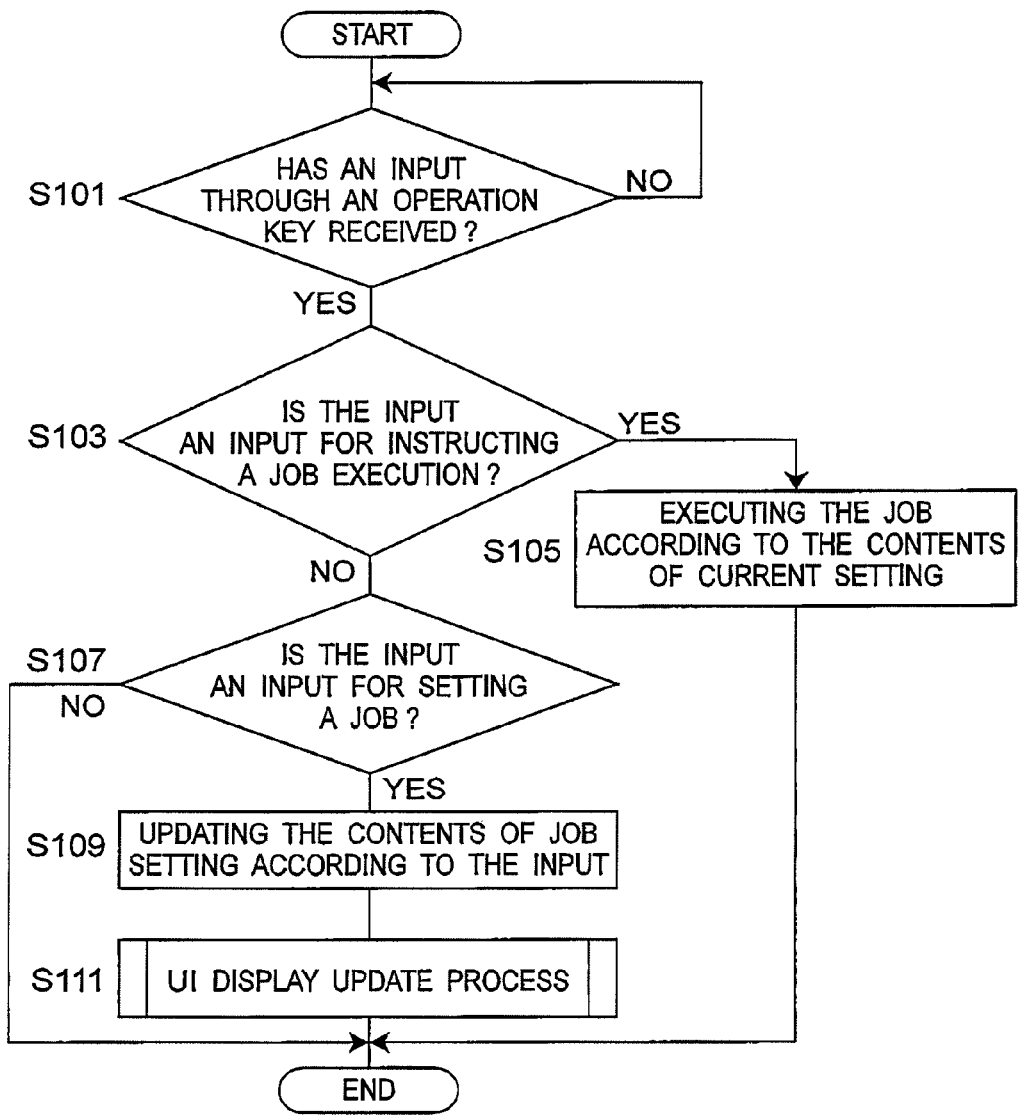
FIG. 4 is a flow chart of a process carried out by the digital complex machine provided with the user interface device according to the embodiment of the present invention.
Figure 5:
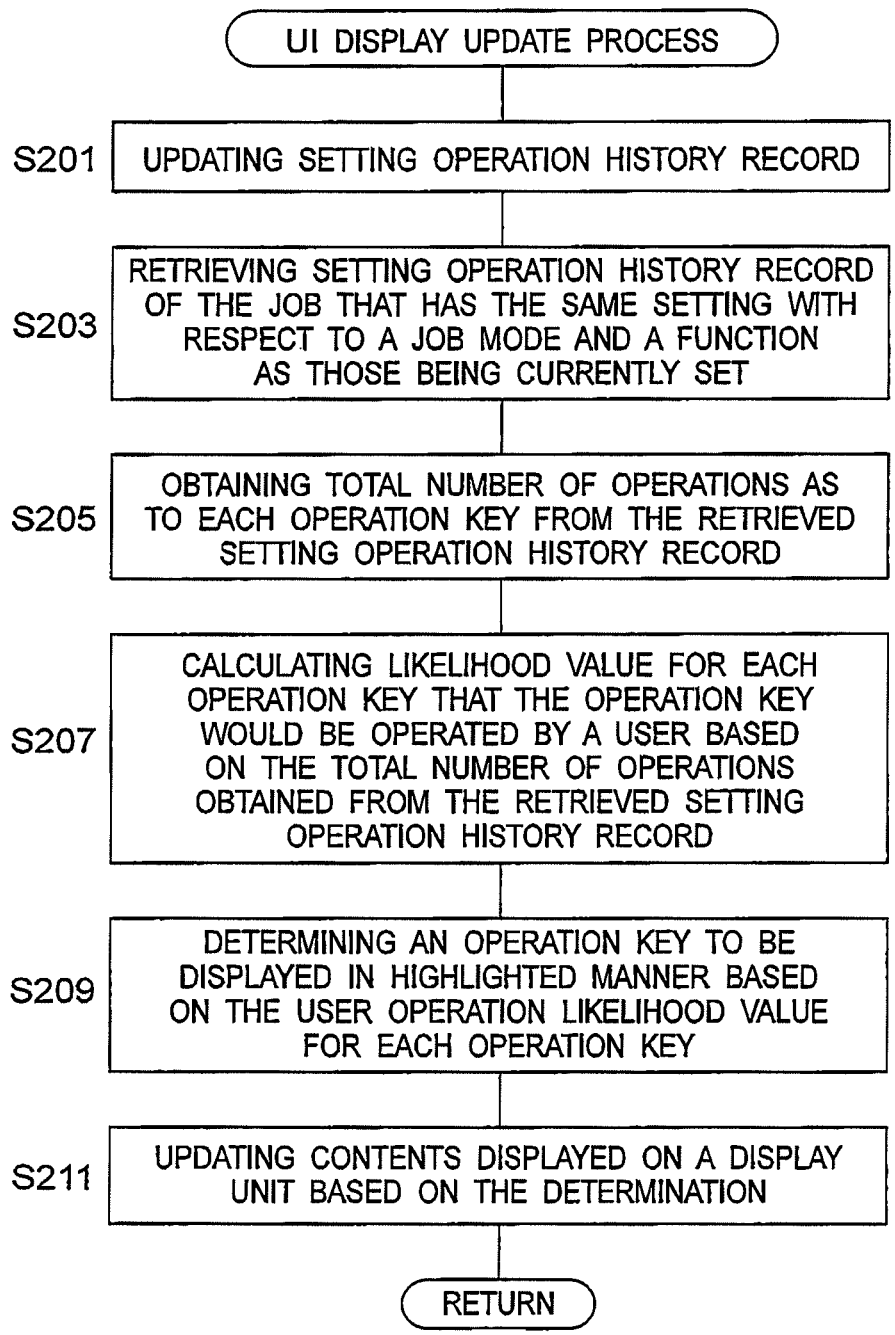
FIG. 5 is a flow chart showing details of a UI display update process carried out by the user interface device according to the embodiment of the present invention.

The following describes the process carried out by the MFP 1 and the UI device 100 with reference to flow charts shown in FIGS. 4 and 5.

FIG. 4 is a flow chart of the process carried out by the MFP 1 and the UI device 100 from reception of a setting operation to a job to an execution of the job of the basis of a content of the accepted setting operation.

In step S101, the MFP 1 and the UI device 100 determine whether or not the user has made a setting operation through the UI device 100 (whether or not the user has operated an operation key). If it is determined that the user has operated the operation key ("YES" in step S101), the process proceeds to step S103. If it is determined that the user has not operated the operation key ("NO" in step S101), the process repeats step S101.

In step S103, the MFP 1 and the UI device 100 determine whether or not the input of the operation key accepted from the user is an instruction to execute a job. If it is determined that the input of the operation key accepted from the user is an instruction to execute a job ("YES" in step S103), the process proceeds to step S105. If it is determined that the input of the operation key accepted from the user is not an instruction to execute a job ("NO" in step S103), the process proceeds to step S107.

In step S105, the MFP 1 executes a job according to the current contents of the settings.

In step S107, the MFP 1 and the UI device 100 determine whether or not the input of the operation key accepted from the user is a setting operation relating to a job. If it is determined that the input of the operation key accepted from the user is a setting operation relating to a job ("YES" in step S107), the process proceeds to step S109. If it is determined that the input of the operation key accepted from the user is not a setting operation relating to a job (but an operation of a reset key, for example) ("NO" in step S107), the processes are terminated.

In step S109, the MFP 1 and the UI device 100 update the content of the setting of the job according to the content of the setting operation accepted from the user.

In step S111, the MFP 1 and the UI device 100 execute the UI display update process based on the content of the setting operation accepted from the user.

FIG. 5 is a flow chart showing step S111 of FIG. 4 (UI display update process) in detail.

In step S201, according to the content of the setting operation accepted from the user, the recording unit 121 of the UI device 100 updates the history record so that the information relating to the content of the setting operation and the operation key that has been used is added to the history record.

In step S203, the retrieving unit 123 of the UI device 100 obtains the history record relating to the past job based on the current content of the setting of the job in the setting operation. For example, when the current content of the setting is a copying job and a function of copying from a single side to double sides is selected, the retrieving unit 123 obtains the history record for the past job for which a copying job for single to double sides photocopier function is selected.

In step S205, the calculating unit 125 of the UI device 100 calculates a total number of setting for each setting operation from the history record obtained in step S203. Specifically, the total number that each operation key is used for the setting operation is calculated. Then, the calculating unit 125 creates a table as shown in FIG. 6, for example, and outputs each value of the table ("total number of operations actual values") to the level depth weighting unit 127, the in-screen position weighting unit 129, and the determining unit 131.

FIG. 6 is an example of a table of the total number of operations calculated in step S205. In this example, a total number of executions of the past job, which is a copying job, for which a single to double sides photocopier function has been selected, and which has been executed, out of the past jobs is 100 times. In a leftmost column of the table, setting operation items are listed. These setting operation items respectively correspond to the operations of the predetermined operation keys. Further, a second column from the left "tab type" indicates information regarding the category groups (input screens) in which the operation keys corresponding to the setting operation items are arranged. A third column from the left "total number of operations" indicates the total numbers that each operation keys are used. A fourth column from the left "rank" indicates an order when the third column "total number of operations" is ranked in descending order. Note that a value "not ranked" in the fourth column "rank" indicates that the operation key is not included in the determination of the rank. In this manner, regarding the "rank" and the like, the operation of the operation key corresponding to a basic operation setup item relating to the job is not ranked, and excluded from estimation of the likelihood that the user operates. For example, the setting operation items such as "color mode" and "paper size" are setup items that are frequently used in the copying job, and accordingly, it is desirable to exclude the operation keys for these items from the estimation of the likelihood that the user operates. This is because, without such exclusion, the likelihood of use of the operation key corresponding to the basic operation setup item is always estimated high and this can prevent the object of the present invention from being achieved. Therefore, in the UI device 100 according to the present embodiment, the basic operation setup items for the jobs are excluded from the likelihood estimation. While the basic operation setup items relating to the copying job are, for example, operation setup items that are indicated "not ranked" in FIG. 6, examples of basic setup items relating to different types of jobs (such as scanning job and facsimile job) provided for the MFP 1 are, for example, "destination setting", "distribution method setting (such as e-mail, FTP, and WebDAV)", "file format setting", and "resolution setting" (these are relating to the scanning job), as well as "(dial) destination setting" and "image type setting" (these are relating to the facsimile job). Information indicated by the columns from a fifth column from the left is described in detail in a section that describes step S207.

The level depth weighting unit 127 (FIG. 3) executes a predetermined weighting calculation to data of values of the received total number of operations, and outputs data of values of weighted total number of operations. The level depth weighting unit 127 executes the weighting calculation, in which the total number of operations is integrated with a weighting coefficient that increases as the depth is deeper, based on depth of a level in which an operation key corresponding to each setting operation item is disposed. The level depth weighting unit 127 then outputs a result of the calculation ("hierarchical level depth consideration value") to the determining unit.

The in-screen position weighting unit 129 (FIG. 3) executes a predetermined weighting calculation to the data of the values of the received total number of operations that is different from the calculation executed by the level depth weighting unit 127, and outputs data of values of weighted total number of operations. The in-screen position weighting unit 129 executes the weighting calculation, in which the total number of operations is integrated with a weighting coefficient that increases as it is harder to attract the user's attention at the position, based on a position in the input screen at which an operation key corresponding to each setting operation item. The in-screen position weighting unit 129 then outputs a result of the calculation ("in-screen position consideration value") to the determining unit. Further, the in-screen position weighting unit 129 additionally executes the weighting calculation based on the position in the input screen to the "hierarchical level depth consideration value" received from the level depth weighting unit 127, and outputs a result of the calculation ("level and position consideration value") to the determining unit.

Referring back to FIG. 5, in step S207, the determining unit 131 estimates relative degrees ("likelihood values") of the use likelihood of the operation keys, based on at least one of the "total number of operations actual value" that has been directly received from the calculating unit 125, the "hierarchical level depth consideration value" that has been received from the level depth weighting unit 127, and the "in-screen position consideration value" and the "level and position consideration value" that have been received from the in-screen position weighting unit 129.

Referring to FIG. 6, the relative degrees ("likelihood values") of the user likelihood estimated in step S207 will be described.

In the UI device 100 according to the present embodiment, it is possible to estimate a total of four types of "likelihood values". The determining unit 131 carries out step S209 that will be later described, using any of the four types of "likelihood values" described below. A first likelihood value is the "total number of operations" in the "total number of operations actual value" for each operation key. A second likelihood value is the "hierarchical level depth consideration value" for each operation key. A third likelihood value is the "in-screen position consideration value" for each operation key. A fourth likelihood value is the "level and position consideration value" for each operation key.

When one of the second to fourth likelihood values is used, the determining unit 131 determines the order of the "likelihood values" to be used in descending order.

Shown in a left side of a column 141 in FIG. 6 are the first likelihood values as described above, and an order based on the first likelihood values is shown in a right side of the column. This order corresponds to an estimated value of the relative degree of the use likelihood. Similarly, shown in a left side of a column 143 are weight values based on the depth of hierarchical level, in a central column are the hierarchical level depth consideration values ("second likelihood values" as described above), and in a right column is an order based on the second likelihood values. This order is an estimated value of the relative degree of the use likelihood considering the hierarchical levels. Similarly, shown in a left side of a column 145 are weight values based on the in-screen position, in a central column are the in-screen position consideration values ("third likelihood values" as described above), and in a right column is an order based on the third likelihood values. This order is an estimated value of the relative degree of the use likelihood considering the in-screen position. Similarly, shown in a left side of a column 147 are weight values based on the depth of hierarchical level and the in-screen position, in a central column are the level and position consideration values ("fourth likelihood values" as described above), and in a right column is an order based on the fourth likelihood value. This order is an estimated value of the relative degree of the use likelihood considering the depth of hierarchical level and the in-screen position.

Referring back to FIG. 5, in step S209, the determining unit 131 determines an operation key to be displayed with the use of the highlighted display design among the operation keys to be displayed in the input screen, based on a value of the use likelihood estimation for at least one of the first to fourth likelihood values. Further, the determining unit 131 can estimate the value of the use likelihood higher for an operation key for switching to an input screen of a category group that includes a greater number of operation keys with higher estimation value than input screens of other category groups. The estimation can be carried out based on a value such as a total sum or an average value of the likelihood values of the operation keys included in the same category group.

For example, the determining unit 131 determines to display a predetermined number (5, for example) of operation keys in descending order of the values of the use likelihood estimation using the highlighted display design. At the same time, the determining unit 131 determines to display other operation keys using the normal display design. The determination is outputted to the LCD control unit 117 (FIG. 3).

In step S211, the LCD control unit 117 (FIG. 3) displays each operation key using the image data of the operation key display design held in the design storing unit 135, according to the input from the determining unit 131.

Next, examples of input screen displays of the LCD panel unit 101 will be described.

FIGS. 7A1 and 7A2 are examples of an input screen displays for a category group "top". FIG. 7A1 shows the example of a screen in a first level of hierarchy of the "top" input screen, and FIG. 7A2 shows the example of a screen in a second level of hierarchy of the "top" input screen. As shown in the figures, operation keys (tab keys TK2, TK3, TK4, and TK5) respectively for displaying input screens of different category groups ("finishing", "original designation", "image type", and "advanced setting") are displayed in this screen. The tab keys are arranged in line as shown in the figures. Accordingly, the tab key TK5 on a rightmost position may attract less attention than the tab keys TK1 and TK2, for example. Therefore, in the UI device 100 according to the present embodiment, the weighting calculation considering the in-screen positions as described above is employed for the calculation of the values of the use likelihood estimation. Further, an operation key K1 for color specification, an operation key K2 for paper selection, an operation key K3 for magnification ratio specification, and an operation key K4 for double/single side specification are displayed in the "top" input screen. Moreover, the operation key K4 functions as an operation key for displaying a screen in the second level of hierarchy (FIG. 7A2).

Figure 7B:
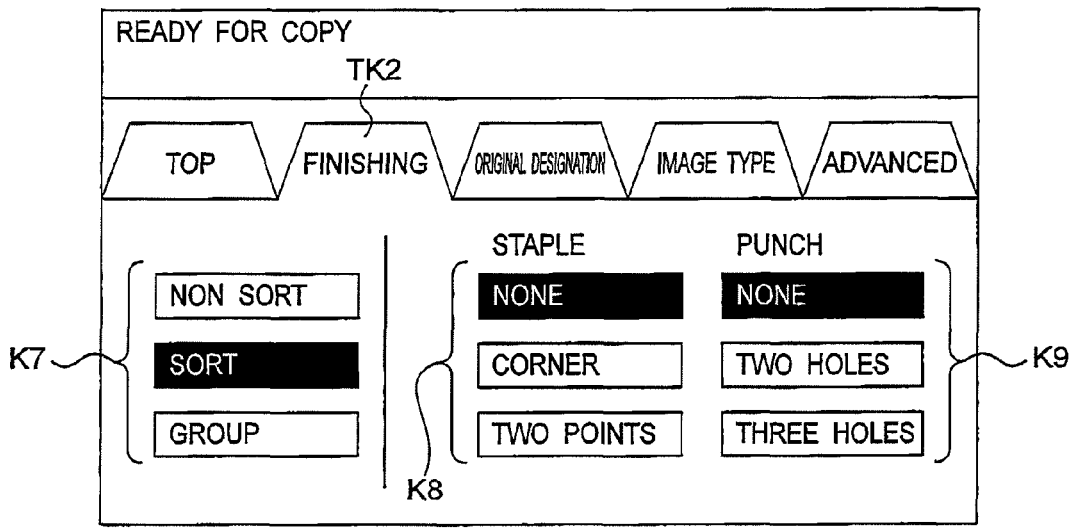

FIG. 7B is an example of input screen display for the category group "finishing". It can be seen that a plurality of operation keys (K7, K8, and K9) are also provided for the "finishing" input screen.

Figure 7C:
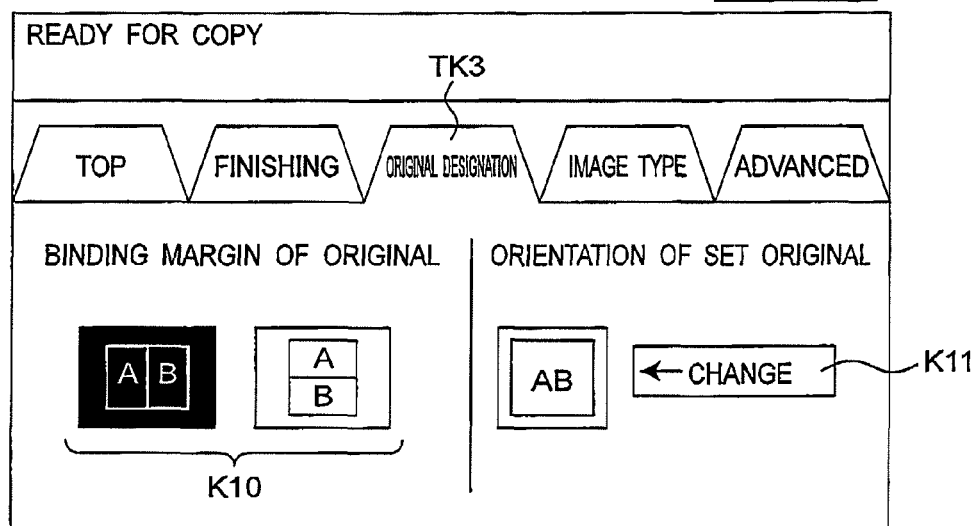
Figure 8C:
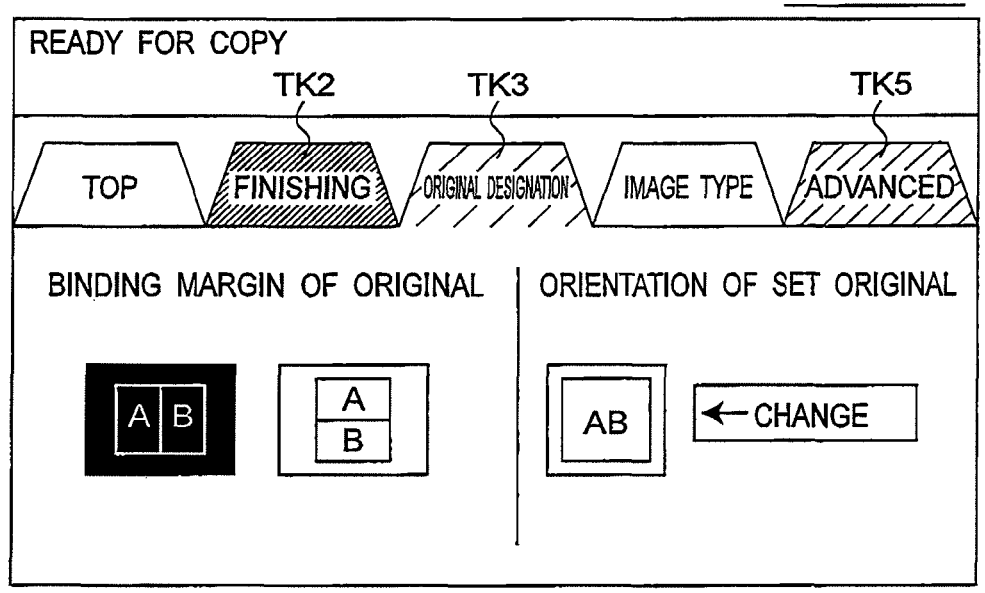
Figure 8D:
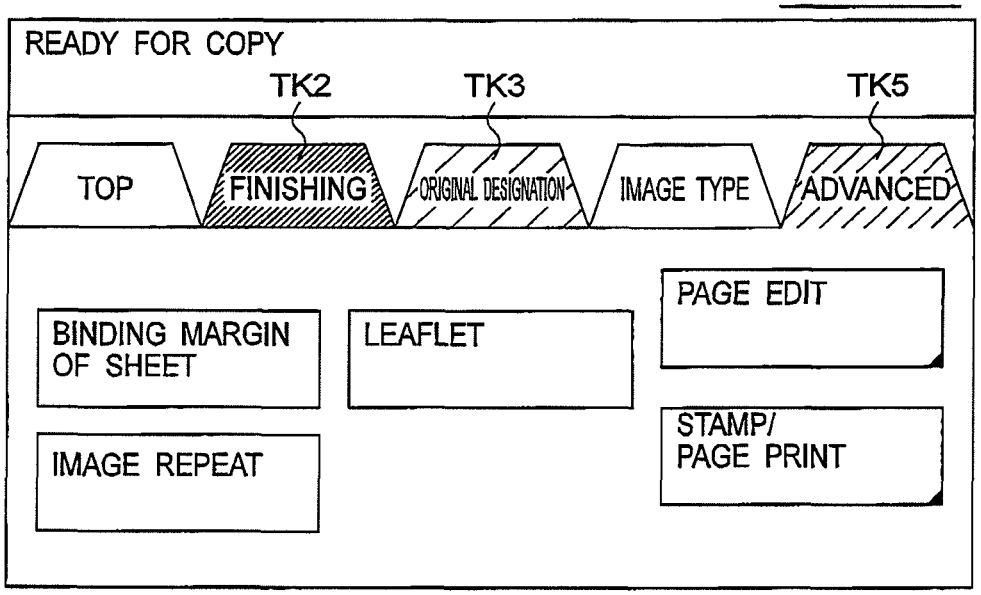
Figure 9B:
Figure 9C:

FIG. 7C is an example of input screen display for the category group "original designation". It can be seen that a plurality of operation keys (K10 and K11) are also provided for the "original designation" input screen.

FIGS. 7D1 and 7D2 are examples of input screen displays for a category group "image type". FIG. 7D1 shows the example of a screen in a first level of hierarchy of the "image type" input screen, and FIG. 7D2 shows the example of a screen in a second level of hierarchy of the "image type" input screen. As shown in the figures, an operation key K14 is displayed at a left bottom corner with a different design from other operation keys such as an operation key K12. This is the design to indicate that an input screen of the next level is displayed by pressing down the operation key K14. Upon pressing down of the operation key K14, an output image type detail setup screen (FIG. 7D2), which is the screen in the second level of hierarchy, is displayed.

FIGS. 7E1 and 7E2 are examples of input screen displays for a category group "advanced setting". FIG. 7E1 shows the example of a screen in a first level of hierarchy of the "advanced setting" input screen, and FIG. 7E2 shows the example of a screen in a second level of hierarchy of the "advanced setting" input screen. As shown in the figures, an operation key K18 is displayed with the design that is the same as the operation key K14 (FIG. 7D1). This is the design to indicate that an input screen of the next level is displayed by pressing down the operation key K18. Upon pressing down of the operation key K18, a page edit detail setup screen (FIG. 7E2), which is the screen in the second level of hierarchy, is displayed. Further, upon pressing down of an operation key K19, a stamp/page print detail setup screen (FIG. 7E3), which is also the screen in the second level of hierarchy, is displayed.

FIGS. 8A1, 8A2, 8B, 8C, and 8D are examples of highlighted operation key displays, in which an input screen switching operation key (tab key) to an input screen including an operation key whose use likelihood is estimated to be high is displayed in colors different from the normal display design. In the figures, the difference in colors is expressed by a difference in hatched patterns. For a black-and-white LCD, the difference in colors can be expressed by a difference in gray levels.

In this manner, by displaying the operation key whose use likelihood is estimated to be high in different colors according to the relative degree of the likelihood (order) of this operation key, the user can obtain information relating to the input screen including the operation key whose use likelihood in a series of job setting operation is estimated to be high, and it is possible to smoothly move to a subsequent setting operation.

FIGS. 9A1, 9A2, 9B, 9C, and 9D are examples of highlighted operation key displays, in which the input screen switching operation key (tab key) to an input screen including an operation key whose use likelihood is estimated to be high is underlined. Further, in this example, the "likelihood value" being different from the display examples such as the one shown in FIG. 8A1 are employed. In this manner, a type of the key that is displayed in the highlighted manner is different depending on which one of the first to the fourth likelihood values is used to determine the degree of the use likelihood. The user can set the MFP 1 accordingly as to which one of the likelihood values is to be used to determine the operation key that is displayed in the highlighted manner.

In this manner, the operation key whose use likelihood is estimated to be high is underlined according to the relative degree of the likelihood (order) of this operation key. Also in this case, the user can obtain information relating to the input screen including the operation key whose use likelihood in a series of job setting operation is estimated to be high, and it is possible to smoothly move to a subsequent setting operation.

FIGS. 10A1, 10A2, 10B, 10C, 10D1, and 10D2 are examples of highlighted operation key displays, in which the input screen switching operation key (tab key) to an input screen including an operation key whose use likelihood is estimated to be high is underlined. Further, in this example, the "likelihood value" being different from the display examples such as the one shown in FIG. 8A1 etc. or in FIG. 9A1 etc. is employed (likelihood values considering the depth of hierarchical levels). Moreover, referring to FIG. 10D1, it can be seen that the highlighted design is also employed for the operation key to display a detail setup screen (lower level screen) for the stamp/page printing. In this manner, the UI device 100 according to the present embodiment can display the operation keys corresponding to the setup items, in addition to the tab keys, in the highlighted design.

As described above, by displaying the operation key whose use likelihood is high using the highlighted design, it is possible for the user to quickly find the operation key to be used.

FIGS. 11A1, 11A2, 11B, 11C, 11D1, and 11D2 are examples of highlighted operation key displays, in which the input screen switching operation key (tab key) to an input screen including an operation key whose use likelihood is estimated to be high is underlined. Further, in this example, unlike the display examples such as the one shown in FIG. 8A1, 9A1, 10A1, or the like, the highlighted design is shown by blinking. In such a display mode, the relative degree of likelihood can be expressed by difference in blinking cycles.

Figure 12B:
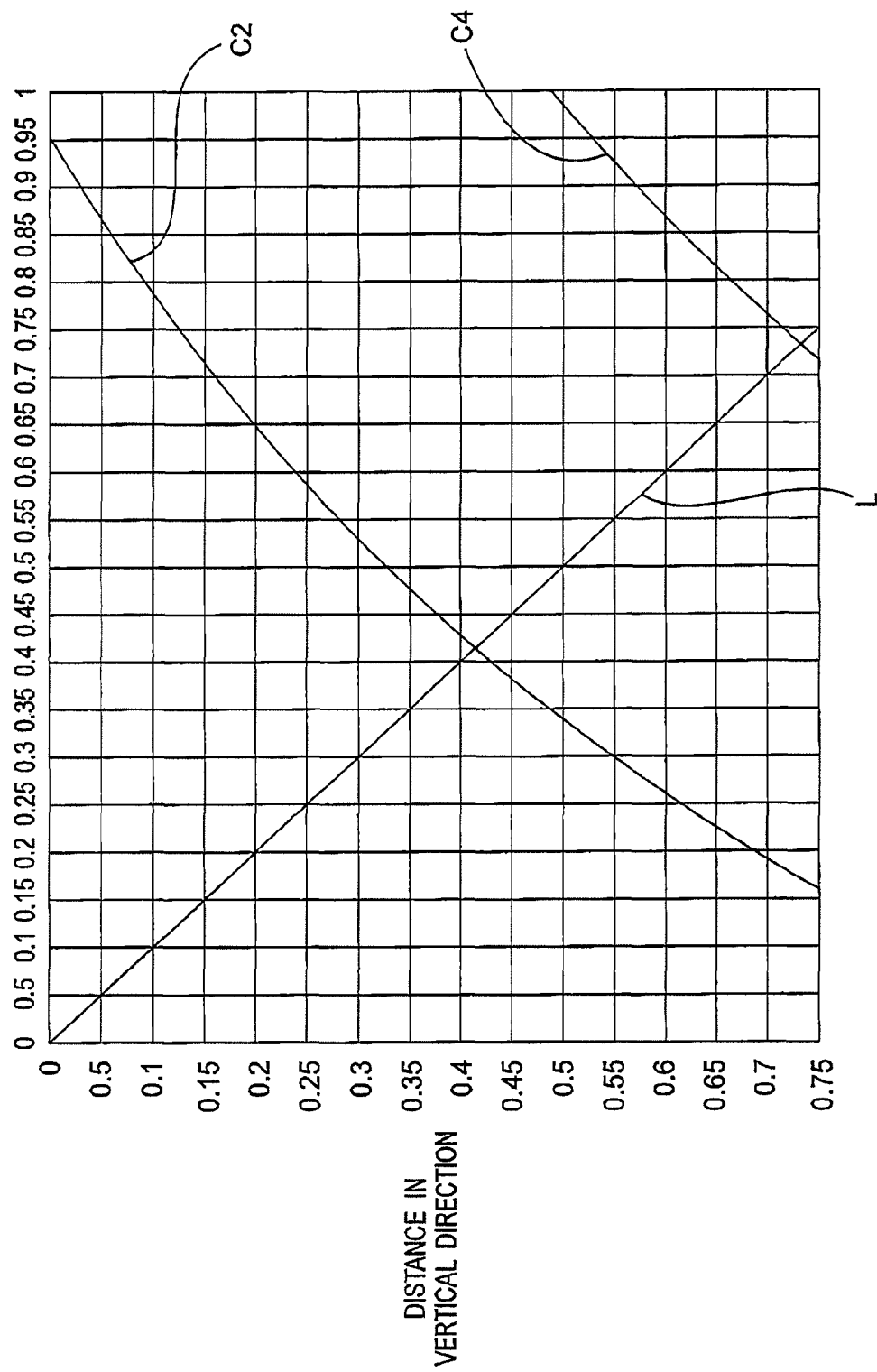

FIGS. 12A and 12B are examples of weight values used in the in-screen position weighting calculation. In the figures, a direction along which the tab keys (TK1 to TK5 (see such as FIG. 7A1)) are lined up is a "primary direction" (in this case, a direction extending left to right in the figures), and a direction vertical to the primary direction is a secondary direction.

In general, the user's attention is considered to monotonously decrease as a distance from a top left corner of the screen increases both in the primary direction and in the secondary direction. Further, ease of movement of a person's field of view varies between left-right movement (primary direction) and up-down movement (secondary direction). Therefore, regarding the weight values used in the in-screen position weighting calculation, when the top left corner is taken as an origin, a rightward direction is taken as a positive direction of an X axis, and a downward direction is taken as a positive direction of a Y axis, it is desirable that a weighting coefficient of a coordinate value ((X, Y), where X>Y) of an operation key is greater than a weighting coefficient of a value (Y, X) obtained by transposing the coordinate value (X, Y). FIGS. 12A and 12B show such a distribution of the weight values. In FIG. 12A, the weight values are expressed by a three dimensional graphical chart. Curves C1, C2, C3, and C4 are isopleth lines of the weight values. Further, FIG. 12B shows a chart of isopleth lines of the weight values. In this case, a relation between the values indicated by the isopleth lines C2 and C4 is C2<C4. Moreover, a straight line L is a line having a slope of 45 degrees (line Y=X). Looking at the isopleth line C2 with the straight line L as an indication, it can be seen that a weight value of an arbitrary coordinate (X, Y) is greater than a weight value of a coordinate (Y, X).

By obtaining the likelihood value by integrating the weight value showing such a distribution with the total number of operations of the operation key, deriving the estimated value of the relative degree of the likelihood based on the likelihood value, and displaying the operation key with a high estimated value using the highlighted design that can easily attract the user's attention, it is possible for the user to quickly find the location of the operation key to be used to set for the job that is to be carried out.

The embodiment of the present invention can be utilized as a user interface unit for image processing apparatuses such as an MFP.

According to the user interface device of the embodiment of the present invention, the user is able to easily find out location of an operation key through a series of input operation. As described above, the user interface device according to the present invention demonstrates superior operability.

As this invention may be embodied in several forms without departing from the spirit of essential characteristic thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A hardware user interface device which displays an operation key in a display unit using a predetermined design, comprising:
   a setting operation history storing unit that stores a setting operation history record of a content of a setting operation carried out by a user for each of past jobs that have been executed;
   a setting operation history retrieving unit that retrieves the setting operation history record of the content of the setting that is the same as a current content of the setting;
   a total number of operations calculating unit that calculates a total number of operations for each operation key based on the content of the setting recorded in the setting operation history record of the same content of the setting; and
   an operation key display type determining unit that estimates relative degrees of likelihood to be used by the user of the operation keys based on the total number of operations for each operation key, and determines, based on the estimation, a design to be used to display the operation key out of a group of designs including at least a first design for normal display and a second design for highlighted display,
   further comprising a level depth weighting unit that executes a weighting calculation by integrating the total number of operations for each operation key with a weight value that increases as a hierarchical level in which the operation key is located becomes deeper, and outputs a total number of operations considering a depth of the hierarchical level and
   wherein:
   said display unit is provided with an input screen, the input screen being configured to include operation keys being grouped into a category group and to have a hierarchized structure; and
   said operation key display type determining unit determines a design for displaying the operation key based on the total number of operations considering the depth of the hierarchical level outputted from said level depth weighting unit.

2. The hardware user interface device according to claim 1, wherein the second design for highlighted display is assigned with color being different from the first design.

3. The hardware user interface device according to claim 1, wherein the second design for highlighted display is highlighted by underlining the corresponding first design.

4. The hardware user interface device according to claim 1, wherein the second design for highlighted display is highlighted by blinking the corresponding first design.

5. A hardware user interface device which displays an operation key in a display unit using a predetermined design, comprising:
   a setting operation history storing unit that stores a setting operation history record of a content of a setting operation carried out by a user for each of past jobs that have been executed;
   a setting operation history retrieving unit that retrieves the setting operation history record of the content of the setting that is the same as a current content of the setting;
   a total number of operations calculating unit that calculates a total number of operations for each operation key based on the content of the setting recorded in the setting operation history record of the same content of the setting; and
   an operation key display type determining unit that estimates relative degrees of likelihood to be used by the user of the operation keys based on the total number of operations for each operation key, and determines, based on the estimation, a design to be used to display the operation key out of a group of designs including at least a first design for normal display and a second design for highlighted display,
   further comprising an in-screen position weighting unit that executes a weighting calculation by integrating the total number of operations for each operation key with a weight value that varies according to a position of the operation key within the display unit, and outputs a total number of operations considering the in-screen position, and
   wherein said operation key display type determining unit determines a design for displaying the operation key based on the total number of operations considering the in-screen position outputted from said in-screen position weighting unit.

6. The hardware user interface device according to claim 5, wherein the weight value that varies according to the position of the operation key varies such that the weight value increases as a distance from a predetermined corner tip of the display unit as a base point becomes greater.

7. A user interface method in a user interface device which displays an operation key in a display unit using a predetermined design, comprising:
   storing by a setting operation history storing unit that stores a setting operation history record of a content of a setting operation carried out by a user for each of past jobs that have been executed;
   retrieving by a setting operation history retrieving unit that retrieves the setting operation history record of the content of the setting that is the same as a current content of the setting;
   calculating by a total number of operations calculating unit that calculates a total number of operations for each operation key based on the content of the setting recorded in the setting operation history record of the same content of the setting; and
   estimating by an operation key display type determining unit relative degrees of likelihood to be used by the user of the operation keys based on the total number of operations for each operation key, and determining, based on the estimation, a design to be used to display the operation key out of a group of designs including at least a first design for normal display and a second design for highlighted display,
   further comprising executing a weighting calculation by a level depth weighting unit, said executing including: integrating the total number of operations for each operation key with a weight value that increases as a hierarchical level in which the operation key is located becomes deeper; and outputting a total number of operations considering a depth of the hierarchical level and wherein:

the display unit is provided with an input screen, the input screen being configured to include operation keys being grouped into a category group and to have a hierarchized structure; and said determining includes determining a design for displaying the operation key based on the total number of operations considering the depth of the hierarchical level outputted from the level depth weighting unit.

8. The user interface method according to claim 7, wherein the second design for highlighted display is assigned with color being different from the first design.

9. The user interface method according to claim 7, wherein the second design for highlighted display is highlighted by underlining the corresponding first design.

10. The user interface method according to claim 7, wherein the second design for highlighted display is highlighted by blinking the corresponding first design.

11. A user interface method in a user interface device which displays an operation key in a display unit using a predetermined design, comprising:

storing by a setting operation history storing unit that stores a setting operation history record of a content of a setting operation carried out by a user for each of past jobs that have been executed;

retrieving by a setting operation history retrieving unit that retrieves the setting operation history record of the content of the setting that is the same as a current content of the setting;

calculating by a total number of operations calculating unit that calculates a total number of operations for each operation key based on the content of the setting recorded in the setting operation history record of the same content of the setting; and estimating by an operation key display type determining unit relative degrees of likelihood to be used by the user of the operation keys based on the total number of operations for each operation key, and determining, based on the estimation, a design to be used to display the operation key out of a group of designs including at least a first design for normal display and a second design for highlighted display, further comprising executing a weighting calculation by an in-screen position weighting unit, said executing including: integrating the total number of operations for each operation key with a weight value that varies according to a position of the operation key within the display unit; and outputting a total number of operations considering the in-screen position, and wherein said determining includes determining a design for displaying the operation key based on the total number of operations considering the in-screen position outputted from the in-screen position weighting unit.

12. The user interface method according to claim 11, wherein the weight value that varies according to the position of the operation key varies such that the weight value increases as a distance from a predetermined corner tip of the display unit as a base point becomes greater.

\* \* \* \* \*